US012518680B2

(12) United States Patent
Zhang et al.

(10) Patent No.: US 12,518,680 B2
(45) Date of Patent: Jan. 6, 2026

(54) DISPLAY PANEL AND DISPLAY DEVICE

(71) Applicant: BOE Technology Group Co., Ltd., Beijing (CN)

(72) Inventors: Shunhang Zhang, Beijing (CN); Zhenyu Zhang, Beijing (CN); Dongni Liu, Beijing (CN); Minghua Xuan, Beijing (CN); Yunsik Im, Beijing (CN); Zhen Zhang, Beijing (CN); Peirou Li, Beijing (CN); Haoliang Zheng, Beijing (CN); Li Xiao, Beijing (CN); Zhuo Li, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 37 days.

(21) Appl. No.: 18/681,870

(22) PCT Filed: Jun. 24, 2022

(86) PCT No.: PCT/CN2022/101312
§ 371 (c)(1),
(2) Date: Feb. 7, 2024

(87) PCT Pub. No.: WO2023/245671
PCT Pub. Date: Dec. 28, 2023

(65) Prior Publication Data
US 2025/0140163 A1 May 1, 2025

(51) Int. Cl.
*G09G 3/32* (2016.01)

(52) U.S. Cl.
CPC ....... *G09G 3/32* (2013.01); *G09G 2300/0465* (2013.01); *G09G 2310/0267* (2013.01);
(Continued)

(58) Field of Classification Search
CPC ............. G09G 3/32; G09G 2300/0465; G09G 2310/0267; G09G 2310/0286; G09G 2310/061; G09G 2310/08
See application file for complete search history.

(56) References Cited

U.S. PATENT DOCUMENTS

2021/0158746 A1* 5/2021 Li ............................ G09G 3/20
2022/0293059 A1* 9/2022 Zhang ........................ G09F 9/33

FOREIGN PATENT DOCUMENTS

CN 106782310 A 5/2017
CN 110503917 A 11/2019
(Continued)

OTHER PUBLICATIONS

International Search Report and Written Opinion mailed on Feb. 21, 2023, in corresponding PCT/CN2022/101312, 8 pages.

*Primary Examiner* — Kenneth B Lee, Jr.
(74) *Attorney, Agent, or Firm* — XSENSUS LLP

(57) ABSTRACT

The present disclosure provides a display panel and a display device. The display panel includes a plurality of pixel units distributed in an array. The pixel unit includes: a pixel driver circuit configured to provide a driving current, a plurality of sub-pixels configured to emit light under an action of the driving current, and a switching circuit including a plurality of switching units arranged in correspondence with the plurality of sub-pixels. The switching unit is connected in series between the pixel driver circuit and a corresponding sub-pixel, a control end of the switching unit is configured to receive a switching signal, a first end of the switching unit is connected to the pixel driver circuit, a second end of the switching unit is connected to the corresponding sub-pixel, and the switching unit conducts a communication path between the sub-pixel and the pixel driver circuit in response to the switching signal.

13 Claims, 13 Drawing Sheets

(52) U.S. Cl.
CPC ............... *G09G 2310/0286* (2013.01); *G09G 2310/061* (2013.01); *G09G 2310/08* (2013.01)

(56) References Cited

FOREIGN PATENT DOCUMENTS

| | | | |
|---|---|---|---|
| CN | 111474758 | A | 7/2020 |
| CN | 112825233 | A | 5/2021 |
| CN | 112967658 | A | 6/2021 |
| CN | 114284303 | A | 4/2022 |
| WO | 2021/017840 | A1 | 2/2021 |

* cited by examiner

DISPLAY PANEL AND DISPLAY DEVICE

CROSS-REFERENCE TO RELATED APPLICATION

The present application is the U.S. National phase application of International Application No. PCT/CN2022/101312, filed on Jun. 24, 2022, the entire contents of which are hereby incorporated by reference in its entirety.

TECHNICAL FIELD

The present disclosure relates to the field of display technologies, and in particular, to a display panel and a display device.

BACKGROUND

Currently, light-emitting diode (LED) display is widely used in the display of outdoor and central control large screen. The current application of LED is mainly for long-distance viewing, with relatively large pixel pitch and low pixels per inch (PPI).

It should be noted that the above information disclosed in the "BACKGROUND" section is intended only to enhance the understanding of the background of this disclosure, and therefore it may include information that does not constitute prior art known to those of ordinary skill in the art.

SUMMARY

The purpose of the present disclosure is to overcome the deficiencies of the above prior art and to provide a display panel and a display device.

According to an aspect of the present disclosure, there is provided a display panel, including a plurality of pixel units distributed in an array along a row direction and a column direction, where the pixel unit includes: a pixel driver circuit configured to provide a driving current; a plurality of sub-pixels, where a first electrode of the sub-pixel is configured to be connected to the pixel driver circuit, a second electrode of the sub-pixel is connected to a second power supply terminal, and the sub-pixel is configured to emit light under an action of the driving current; and a switching circuit including a plurality of switching units arranged in correspondence with the plurality of sub-pixels, where the switching unit is connected in series between the pixel driver circuit and a corresponding sub-pixel, a control end of the switching unit is configured to receive a switching signal, a first end of the switching unit is connected to the pixel driver circuit, a second end of the switching unit is connected to a first electrode of the corresponding sub-pixel, and the switching unit is configured to conduct a communication path between the corresponding sub-pixel and the pixel driver circuit in response to the switching signal.

In an embodiment of the present disclosure, the display panel includes a base substrate; where in a same pixel unit, an orthographic projection of the pixel driver circuit on the base substrate is on a side, away from an orthographic projection of the second electrode of the sub-pixel on the base substrate, of an orthographic projection of the first electrode of the sub-pixel on the base substrate, and an orthographic projection of the switching unit on the base substrate is between an orthographic projection of the first electrode of the corresponding sub-pixel on the base substrate and an orthographic projection of the second electrode of the corresponding sub-pixel on the base substrate.

In an embodiment of the present disclosure, the display panel further includes a first driving circuit in a display area of the display panel, the first driving circuit being configured to output a gate control signal; where the pixel driver circuit is configured to transmit a data signal from a data signal terminal to a driving signal terminal in response to the gate control signal.

In an embodiment of the present disclosure, the first driving circuit includes a plurality of cascaded first shift register units, and the first shift register unit that provides the gate control signal to a $n^{th}$ row of pixel units is between the $n^{th}$ row of pixel units and a $(n+1)^{th}$ row of pixel units, n being a positive integer greater than 0.

In an embodiment of the present disclosure, the display panel further includes a switch driving circuit in the display area of the display panel, where the switch driving circuit is configured to output the switching signal.

In an embodiment of the present disclosure, the switch driving circuit includes a plurality of sub-switch driving circuits, one sub-switch driving circuit being configured to drive a column of switching units; and where the sub-switch driving circuit includes a plurality of cascaded third shift register units, and the third shift register unit that provides the switching signal to a $n^{th}$ row of switching circuits is in a gap between the $n^{th}$ row of pixel units and a $(n+1)^{th}$ row of pixel units, n being a positive integer greater than 0.

In an embodiment of the present disclosure, the pixel unit includes a first sub-pixel, a second sub-pixel and a third sub-pixel; the switching circuit includes a first switching unit, a second switching unit and a third switching unit, where the first switching unit is correspondingly connected to the first sub-pixel, the second switching unit is correspondingly connected to the second sub-pixel, and the third switching unit is correspondingly connected to the third sub-pixel; and the switch driving circuit includes a first sub-switch driving circuit, a second sub-switch driving circuit and a third sub-switch driving circuit, wherein the first sub-switch driving circuit is configured to output a first switching signal to the first switching unit, the second sub-switch driving circuit is configured to output a second switching signal to the second switching unit, and the third sub-switch driving circuit is configured to output a third switching signal to the third switching unit; where the first sub-switch driving circuit, the second sub-switch driving circuit and the third sub-switch driving circuit are configured to successively output the first switching signal, the second switching signal and the third switching signal row by row; and the first driving circuit is configured to output gate control signals respectively during a time when the first sub-switch driving circuit outputs the first switching signal, during a time when the second sub-switch driving circuit outputs the second switching signal, and during a time when the third sub-switch driving circuit outputs the third switching signal.

In an embodiment of the present disclosure, the display panel includes two switch driving circuits disposed separately along the row direction on two sides of the display area.

In an embodiment of the present disclosure, the display panel further includes: a first driving circuit, the first driving circuit being configured to output a gate control signal, wherein the pixel driver circuit is configured to transmit a data signal from a data signal terminal to a driving signal terminal in response to the gate control signal; and a driver integrated circuit configured to output switching signals to the plurality of switching units, respectively.

In an embodiment of the present disclosure, the first driving circuit is in a non-display area of the display panel.

In an embodiment of the present disclosure, the pixel unit includes a first sub-pixel, a second sub-pixel and a third sub-pixel. The switching circuit includes a first switching unit, a second switching unit and a third switching unit, where the first switching unit is correspondingly connected to the first sub-pixel, the second switching unit is correspondingly connected to the second sub-pixel, and the third switching unit is correspondingly connected to the third sub-pixel. In a frame of data, the driver integrated circuit is configured to successively output a first switching signal, a second switching signal and a third switching signal; during a time when the driver integrated circuit outputs the first switching signal, the first driving circuit is configured to sequentially output a first gate control signal to each pixel driver circuit, and the pixel driver circuit is configured to provide the driving current to the first sub-pixel in response to the first gate control signal; during a time when the driver integrated circuit outputs the second switching signal, the first driving circuit is configured to sequentially output a second gate control signal to each pixel driver circuit, and the pixel driver circuit is configured to provide the driving current to the second sub-pixel in response to the second gate control signal; and during a time when the driver integrated circuit outputs the third switching signal, the first driving circuit is configured to sequentially output a third gate control signal to each pixel driver circuit, and the pixel driver circuit is configured to provide the driving current to the third sub-pixel in response to the third gate control signal.

In an embodiment of the present disclosure, in the frame of data, the first switching signal, the second switching signal, and the third switching signal have a same duration.

In an embodiment of the present disclosure, the first driving circuit is configured to output the gate control signal in accordance with a first frequency and the driver integrated circuit is configured to output the switching signal in accordance with a second frequency, the first frequency being three times the second frequency.

In an embodiment of the present disclosure, the pixel driver circuit includes: a driver device connected to a first node, a second node and a third node, where the driver device is configured to provide, in response to a voltage signal from the first node, the driving current using a voltage difference between the second node and the third node; a first reset device connected to the first node, a first reset signal terminal and an initial signal terminal, where the first reset device is configured to transmit an initial signal from the initial signal terminal to the first node in response to a reset signal from the first reset signal terminal; a transmission device connected to the first node, a gate signal terminal and the second node, where the transmission device is configured to conduct a communication path between the first node and the second node in response to a signal from the gate signal terminal; a data writing device connected to a data signal terminal, the gate signal terminal and the third node, where the data writing device is configured to transmit a second data signal from the data signal terminal to the third node in response to the signal from the gate signal terminal; a second reset device connected to a fourth node, the initial signal terminal and the first reset signal terminal, where the second reset device is configured to transmit the initial signal from the initial signal terminal to the fourth node in response to the reset signal from the first reset signal terminal; a first light-emitting control device connected to the third node, an enable signal terminal and a first power supply terminal, where the first light-emitting control device is configured to conduct a communication path between the third node and the first power supply terminal in response to an enable signal from the enable signal terminal; a second light-emitting control device connected to the second node, the fourth node and an adjustment device, where the second light-emitting control device is configured to conduct a communication path between the fourth node and the second node in response to a signal from the adjustment device; a storage device connected to the first node and the first power supply terminal, where the storage device is configured to store the voltage signal written to the first node; and the adjustment device connected to the data signal terminal, a second reset signal terminal, the first reset signal terminal, the initial signal terminal and the enable signal terminal, wherein the adjustment device is configured to turn off the second light-emitting control device in response to a first data signal from the data signal terminal, or to turn on the second light-emitting control device in response to a second data signal from the data signal terminal.

In an embodiment of the present disclosure, the driver device includes: a driver transistor with a control end connected to the first node, a first end connected to the third node, and a second end connected to the second node; the first reset device includes: a first transistor with a control end connected to the first reset signal terminal, a first end connected to the first node, and a second end connected to the initial signal terminal; the transmission device includes: a second transistor with a control end connected to the gate signal terminal, a first end connected to the first node, and a second end connected to the second node; the data writing device includes: a fourth transistor with a control end connected to the gate signal terminal, a first end connected to the data signal terminal, and a second end connected to the third node; the second reset device includes: a seventh transistor with a control end connected to the first reset signal terminal, a first end connected to the initial signal terminal, and a second end connected to the fourth node; the first light-emitting control device includes: a fifth transistor with a control end connected to the enable signal terminal, a first end connected to the first power supply terminal, and a second end connected to the third node; the second light-emitting control device includes: a sixth transistor with a control end connected to a seventh node, a first end connected to the second node, and a second end connected to the fourth node; the storage device includes: a storage capacitor with a first electrode connected to the first power supply terminal, and a second electrode connected to the first node; and the adjustment device includes: an eighth transistor with a control end connected to the second reset signal terminal, a first end connected to the data signal terminal, and a second end connected to a fifth node, where the eighth transistor is configured to transmit the data signal from the data signal terminal to the fifth node in response to a reset signal from the second reset signal terminal; a ninth transistor with a control end connected to the fifth node, a first end connected to the enable signal terminal, and a second end connected to the seventh node, where the ninth transistor is configured to transmit the enable signal from the enable signal terminal to the seventh node in response to a voltage signal from the fifth node; a first capacitor connected to the fifth node and the initial signal terminal, where the first capacitor is configured to store the voltage signal written to the fifth node; a tenth transistor with a control end connected to the first reset signal terminal, a first end connected to the data signal terminal, and a second end connected to a sixth node, where the tenth transistor is configured to transmit the data signal from the data signal terminal to the sixth node in response to the reset signal from the first reset signal terminal; an eleventh transistor with a control end connected to the sixth node, a first end connected to a high-frequency signal terminal, and a second end connected to the seventh node, where the eleventh transistor is configured to transmit a signal from the high-frequency signal terminal to the seventh node in response to a voltage signal from the sixth node; and a second capacitor connected to the sixth node and the initial signal terminal, where the second capacitor is configured to store the voltage signal written to the sixth node.

In an embodiment of the present disclosure, the switching unit is a transistor.

In an embodiment of the present disclosure, the pixel unit includes a first sub-pixel, a second sub-pixel, and a third sub-pixel, and the switching circuit includes a twelfth transistor, a thirteenth transistor, and a fourteenth transistor; where a control end of the twelfth transistor is configured to receive a first switching signal, a first end of the twelfth transistor is connected to the fourth node, and a second end of the twelfth transistor is connected to a first electrode of the first sub-pixel; a control end of the thirteenth transistor is configured to receive a second switching signal, a first end of the thirteenth transistor is connected to the fourth node, and a second end of the thirteenth transistor is connected to a first electrode of the second sub-pixel; and a control end of the fourteenth transistor is configured to receive a third switching signal, a first end of the fourteenth transistor is connected to the fourth node, and a second end of the fourteenth transistor is connected to a first electrode of the third sub-pixel.

In an embodiment of the present disclosure, the display panel includes a base substrate; a first conductive layer on a side of the base substrate, the first conductive layer including: a third conductive portion configured to form a first electrode of the storage capacitor; an active layer on a side of the first conductive layer away from the base substrate, the active layer including: a first active portion, where an orthographic projection of the first active portion on the base substrate is between an orthographic projection of a first conductive portion on the base substrate and an orthographic projection of the third conductive portion on the base substrate, and the first active portion is configured to form a channel region of the first transistor; a first sub-active portion connected to a side of the first active portion and configured to form the first end of the first transistor; a second sub-active portion connected to an other side of the first active portion and configured to form the second end of the first transistor and the first end of the seventh transistor; a seventh active portion, where a side of the seventh active portion is connected to the second sub-active portion, and the seventh active portion is configured to form a channel region of the seventh transistor; a fourteenth sub-active portion connected to an other side of the seventh active portion and configured to form the second end of the seventh transistor; a third active portion, where an orthographic projection of the third active portion on the base substrate is on a side of the orthographic projection of the third conductive portion on the base substrate along the column direction, and the third active portion is configured to form a channel region of the driver transistor; a fifth sub-active portion connected to a side of the third active portion in the column direction and configured to form the first end of the driver transistor; a sixth sub-active portion connected to an other side of the third active portion and configured to form the second end of the driver transistor; a second active portion on a side of the third active portion along the row direction, the second active portion being configured to form a channel region of the second transistor; a third sub-active portion connected to a side of the second active portion close to the third active portion along the row direction, the third sub-active portion being configured to form the first end of the second transistor; a fourth sub-active portion connected to a side of the second active portion away from the third active portion, the fourth sub-active portion being configured to form the second end of the second transistor; a fourth active portion on a side of the third active portion away from the second active portion, the fourth active portion being configured to form a channel region of the fourth transistor; a seventh sub-active portion connected to a side of the fourth active portion away from the third active portion, the seventh sub-active portion being configured to form the first end of the fourth transistor; an eighth sub-active portion connected to a side of the fourth active portion close to the third active portion, the eighth sub-active portion being configured to form the second end of the fourth transistor; a fifth active portion, where an orthographic projection of the fifth active portion on the base substrate is between the orthographic projection of the third active portion on the base substrate and the orthographic projection of the third conductive portion on the base substrate, and the fifth active portion is configured to form a channel region of the fifth transistor; a ninth sub-active portion connected to a side of the fifth active portion away from the third active portion, the ninth sub-active portion being configured to form the first end of the fifth transistor; a tenth sub-active portion connected to a side of the fifth active portion close to the third active portion, the tenth sub-active portion being configured to form the second end of the fifth transistor; a sixth active portion on a side of the fifth active portion along the row direction, the sixth active portion being configured to form a channel region of the sixth transistor; an eleventh sub-active portion connected to a side of the sixth active portion close to the third active portion, the eleventh sub-active portion being configured to form the first end of the sixth transistor; a twelfth sub-active portion connected to an other side of the sixth active portion, the twelfth sub-active portion being configured to form the second end of the sixth transistor; a second conductive layer on a side of the active layer away from the base substrate, the second conductive layer including: a third conductive block including a first component, a second component and a third component connected in sequence, where an orthographic projection of the first component on the base substrate partially overlaps with the orthographic projection of the third conductive portion on the base substrate, an orthographic projection of the third component on the base substrate covers the orthographic projection of the third active portion on the base substrate, and a portion of the third conductive portion is configured to form the second electrode of the storage capacitor and a portion of the third conductive portion is configured to form a top gate of the driver transistor; a gate signal line, where an orthographic projection of the gate signal line on the base substrate extends in the row direction, the orthographic projection of the gate signal line on the base substrate is on a side of the orthographic projection of the third component on the base substrate away from the orthographic projection of the first component on the base substrate, the orthographic projection of the gate signal line on the base substrate partially covers an orthographic projection of the second active portion on the base substrate, and partially covers an orthographic projection of the fourth active portion on the base substrate, and a portion of the gate signal line is configured to form a gate of the second transistor and a portion of the gate signal line is configured to form a gate of the fourth transistor; an enable signal line including a main body portion, a first sub-extension portion and a second sub-extension portion connected in sequence, where an orthographic projection of the main body portion on the base substrate is on a side of an orthographic projection of the third conductive block on the base substrate away from the orthographic projection of the gate signal line on the base substrate, an orthographic projection of the second sub-extension portion on the base substrate covers the orthographic projection of the fifth active portion on the base substrate, and a portion of the enable signal line is configured to form a gate of the fifth transistor; a sixth conductive block including a first sub-conductive block and a second sub-conductive block, where an orthographic projection of the first sub-conductive block on the base substrate extends in the column direction, an orthographic projection of the second sub-conductive block on the base substrate covers an orthographic projection of the sixth active portion on the base substrate, and a portion of the sixth conductive block is configured to form a gate of the sixth transistor; and a first reset signal line, where an orthographic projection of the first reset signal line on the base substrate extends in the row direction and is on a side of the orthographic projection of the third conductive block on the base substrate away from the orthographic projection of the third active portion on the base substrate, and the orthographic projection of the first reset signal line on the base substrate covers the orthographic projection of the first active portion on the base substrate and an orthographic projection of the seventh active portion on the base substrate, and a portion of the first reset signal line is configured to form a gate of the first transistor and a gate of the seventh transistor; and a third conductive layer on a side of the second conductive layer away from the base substrate, the third conductive layer including: a third transfer portion, where an end of the third transfer portion is connected to the third sub-active portion through a via hole, and an other end of the third transfer portion is connected to the third conductive block through a via hole; a fourth transfer portion connected to the fourth sub-active portion, the sixth sub-active portion, and the eleventh sub-active portion through via holes, respectively; a fifth transfer portion connected to the fifth sub-active portion, the eighth sub-active portion, and the tenth sub-active portion through via holes, respectively; a sixth transfer portion connected to the twelfth sub-active portion through a via hole; a seventeenth conductive block including a main conductive portion and a sub-conductive portion, where an orthographic projection of the main conductive portion on the base substrate is on the orthographic projection of the third conductive block on the base substrate, and where the seventeenth conductive block is connected to the third conductive portion and to the ninth sub-active portion through via holes, respectively, and a portion of the seventeenth conductive block is configured to form the first electrode of the storage capacitor and a portion of the seventeenth conductive block is configured to form the first end of the fifth transistor; and a data signal line, where an orthographic projection of the data signal line on the base substrate extends in the column direction, and the data line is connected to the seventh sub-active portion through a via hole.

In an embodiment of the present disclosure, the first conductive layer further includes: a first conductive portion configured to form a first electrode of the first capacitor; a second conductive portion configured to form a second electrode of the second capacitor; a fourth conductive portion on a side of the third conductive portion away from the first conductive portion, where an orthographic projection of the fourth conductive portion on the base substrate covers the orthographic projection of the third active portion on the base substrate, and the fourth conductive portion is configured to form a bottom gate of the driver transistor; and a fifth conductive portion connected to a side of the fourth conductive portion, where the fifth conductive portion is connected to the third transfer portion through a via hole; the active layer further includes: an eighth active portion, where an orthographic projection of the eighth active portion on the base substrate is between an orthographic projection of the first conductive portion on the base substrate and the orthographic projection of the third conductive portion on the base substrate, and the eighth active portion is configured to form a channel region of the eighth transistor; a fifteenth sub-active portion connected to a side of the eighth active portion and configured to form the first end of the eighth transistor; a sixteenth sub-active portion connected to an other side of the eighth active portion and configured to form the second end of the eighth transistor; a ninth active portion, where an orthographic projection of the ninth active portion on the base substrate is between the orthographic projection of the first conductive portion on the base substrate and the orthographic projection of the third conductive portion on the base substrate, and the ninth active portion is configured to form a channel region of the ninth transistor; a seventeenth sub-active portion connected to a side of the ninth active portion and configured to form the first end of the ninth transistor; an eighteenth sub-active portion connected to an other side of the ninth active portion and configured to form the second end of the ninth transistor; a tenth active portion, where an orthographic projection of the tenth active portion on the base substrate is between the orthographic projection of the first conductive portion on the base substrate and the orthographic projection of the third conductive portion on the base substrate, and the tenth active portion is configured to form a channel region of the tenth transistor; a nineteenth sub-active portion connected to a side of the tenth active portion and configured to form the first end of the tenth transistor; a twentieth sub-active portion connected to an other side of the tenth active portion and configured to form the second end of the tenth transistor; an eleventh active portion, where an orthographic projection of the eleventh active portion on the base substrate is between the orthographic projection of the first conductive portion on the base substrate and the orthographic projection of the third conductive portion on the base substrate, and the eleventh active portion is configured to form a channel region of the eleventh transistor; a twenty-first sub-active portion connected to a side of the eleventh active portion and configured to form the first end of the eleventh transistor; and a twenty-second sub-active portion connected to an other side of the eleventh active portion and configured to form the second end of the eleventh transistor; the second conductive layer further includes: a first high-frequency signal line, where an orthographic projection of the first high-frequency signal line on the base substrate extends in the row direction and is on a side of the orthographic projection of the first conductive portion on the base substrate away from the orthographic projection of the third conductive portion on the base substrate; a third power line, where an orthographic projection of the third power line on the base substrate extends in the row direction and is between the orthographic projection of the first high-frequency signal line on the base substrate and the orthographic projection of the first conductive portion on the base substrate, and the third power line is configured to provide the second power supply terminal of the first sub-pixel; a second power line, where an orthographic projection of the second power line on the base substrate extends in the row direction and is between the orthographic projection of the third power line on the base substrate and the orthographic projection of the first conductive portion on the base substrate, and the second power line is configured to provide the second power supply terminal of the second sub-pixel and the second power supply terminal of the third sub-pixel; an initial signal line, where an orthographic projection of the initial signal line on the base substrate extends in the row direction and is between the orthographic projection of the first conductive portion on the base substrate and the orthographic projection of the third conductive portion on the base substrate; a second reset signal line, where an orthographic projection of the second reset signal line on the base substrate extends in the row direction and is between the orthographic projection of the initial signal line on the base substrate and the orthographic projection of the third conductive block on the base substrate, the orthographic projection of the second reset signal line on the base substrate covers the orthographic projection of the eighth active portion on the base substrate, and a portion of the second reset signal line is configured to form a gate of the eighth transistor; a first power line, where an orthographic projection of the first power line on the base substrate extends in the row direction and is between the orthographic projection of the first reset signal line on the base substrate and the orthographic projection of the third conductive block on the base substrate, and the orthographic projection of the main body portion of the enable signal line on the base substrate is between the orthographic projection of the first power line on the base substrate and the orthographic projection of the third conductive portion on the base substrate; a first conductive block, where an orthographic projection of the first conductive block on the base substrate is on the orthographic projection of the first conductive portion on the base substrate, and the first conductive block is configured to form a second electrode of the first capacitor; a second conductive block, where an orthographic projection of the second conductive block on the base substrate is on the orthographic projection of the second conductive portion on the base substrate, and the second conductive block is configured to form a second electrode of the second capacitor; the third conductive block including the first component, the second component and the third component, where the orthographic projection of the first component on the base substrate is on the orthographic projection of the third conductive portion on the base substrate, and the first component is configured to form the second electrode of the storage capacitor; and where the orthographic projection of the third component on the base substrate covers the orthographic projection of the third active portion on the base substrate, and the third component is configured to form a gate of the driver transistor; a fourth conductive block, where an orthographic projection of the fourth conductive block on the base substrate covers the orthographic projection of the ninth active portion on the base substrate, and a portion of the fourth conductive block is configured to form a gate of the ninth transistor; a sixth conductive block including a first sub-conductive block and a second sub-conductive block, where an orthographic projection of the first sub-conductive block on the base substrate extends in the column direction, an orthographic projection of the second sub-conductive block on the base substrate extends in the row direction, the orthographic projection of the second sub-conductive block on the base substrate covers the orthographic projection of the sixth active portion on the base substrate, and a portion of the sixth conductive block is configured to form a gate of the sixth transistor; a ninth conductive block, where an orthographic projection of the ninth conductive block on the base substrate overs the orthographic projection of the eleventh active portion on the base substrate, a portion of the ninth conductive block is configured to form a gate of the eleventh transistor, and the ninth conductive block is connected to an eleventh transfer portion and a twelfth transfer portion through via holes, respectively; and a tenth conductive block connected to the seventeenth sub-active portion through a via hole; and the third conductive layer further includes: a second high-frequency signal line, where an orthographic projection of the second high-frequency signal line on the base substrate extends in the column direction, and the second high-frequency signal line is connected to the first high-frequency signal line through a via hole; a data signal line, where an orthographic projection of the data signal line on the base substrate extends in the column direction, and the data signal line is connected to the seventh sub-active portion, the fifteenth sub-active portion, and the nineteenth sub-active portion through via holes; a first transfer portion connected to the first sub-active portion and the third conductive block through via holes, respectively; a second transfer portion connected to the second sub-active portion and the initial signal line through via holes, respectively; a seventh transfer portion connected to the first conductive block, the sixteenth sub-active portion, and the fourth conductive block through via holes, respectively; an eighth transfer portion connected to the seventeenth sub-active portion and the enable signal line through via holes, respectively; a ninth transfer portion connected to a fifth conductive block in the second conductive layer and the eighteenth sub-active portion and the twenty-second sub-active portion through via holes, respectively; a tenth transfer portion connected to the fifth conductive block and the sixth conductive block through via holes, respectively; an eleventh transfer portion connected to the twentieth sub-active portion and the ninth conductive block through via holes, respectively; a twelfth transfer portion connected to the ninth conductive block and the second conductive block through via holes, respectively; and a sixteenth transfer portion connected to the twenty-first sub-active portion and a seventh conductive block in the second conductive layer through via holes, respectively, where the seventh conductive block is further connected to the second high-frequency signal line through a via hole; where the orthographic projection of the first reset signal line on the base substrate further covers the orthographic projection of the tenth active section on the base substrate, and where a portion of the first reset signal line is configured to form a gate of the tenth transistor.

In an embodiment of the present disclosure, the active layer further includes: a twelfth active portion configured to form a channel region of the twelfth transistor; a twenty-third sub-active portion connected to a side of the twelfth active portion, where the twenty-third sub-active portion is configured to form the first end of the twelfth transistor, and the twenty-third sub-active portion is connected to the sixth transfer portion through a via hole; a twenty-fourth sub-active portion connected to an other side of the twelfth active portion and configured to form the second end of the twelfth transistor; a thirteenth active portion configured to form a channel region of the thirteenth transistor; a twenty-fifth sub-active portion connected to a side of the thirteenth active portion and configured to form the first end of the thirteenth transistor, where the twenty-fifth sub-active portion is connected to the sixth transfer portion through a via hole; a twenty-sixth sub-active portion connected to an other side of the thirteenth active portion and configured to form the second end of the thirteenth transistor; a fourteenth active portion configured to form a channel region of the fourteenth transistor; a twenty-seventh sub-active portion connected to a side of the fourteenth active portion and configured to form the first end of the fourteenth transistor, where the twenty-seventh sub-active portion is connected to the sixth transfer portion through a via hole; a twenty-eighth sub-active portion connected to an other end of the fourteenth active portion and configured to form the second end of the fourteenth transistor; the second conductive layer further includes: a twelfth conductive block, where an orthographic projection of the twelfth conductive block on the base substrate covers an orthographic projection of the twelfth active portion on the base substrate, and the twelfth conductive block is configured to form a gate of the twelfth transistor; a thirteenth conductive block, where an orthographic projection of the thirteenth conductive block on the base substrate covers an orthographic projection of the thirteenth active portion on the base substrate, and the thirteenth conductive block is configured to form a gate of the thirteenth transistor; and a fourteenth conductive block, where an orthographic projection of the fourteenth conductive block on the base substrate covers an orthographic projection of the fourteenth active portion on the base substrate, and the fourteenth conductive block is configured to form a gate of the fourteenth transistor; and the third conductive layer further includes: a thirteenth transfer portion connected to the twenty-fourth sub-active portion through a via hole; a fourteenth transfer portion connected to the twenty-sixth sub-active portion through a via hole; and a fifteenth transfer portion connected to the twenty-eighth sub-active portion through a via hole; and where the display panel further includes: a fourth conductive layer on a side of the third conductive layer away from the base substrate, the fourth conductive layer including: a twentieth conductive block configured to form the first electrode of the first sub-pixel, where the twentieth conductive block is connected to the thirteenth transfer portion through a via hole; a twenty-first conductive block configured to form the first electrode of the second sub-pixel, where the twenty-first conductive block is connected to the fourteenth transfer portion through a via hole; and a twenty-second conductive block configured to form the first electrode of the third sub-pixel, where the twenty-second conductive block is connected to the fifteenth transfer portion through a via hole.

According to a second aspect of the present disclosure, there is provided a display device including the display panel described in any one of embodiments of the present disclosure.

It should be understood that the above general description and the following detailed descriptions are exemplary and explanatory only and do not limit the present disclosure.

BRIEF DESCRIPTION OF THE DRAWINGS

The accompanying drawings herein are incorporated into and form part of the specification, show embodiments that are consistent with the present disclosure, and are used in conjunction with the specification to explain the concepts of the present disclosure. It will be apparent that the accompanying drawings in the following description are only some of embodiments of the present disclosure, and that other drawings may be obtained from these drawings without creative effort by those of ordinary skill in the art.

DETAILED DESCRIPTION

Figure 1:
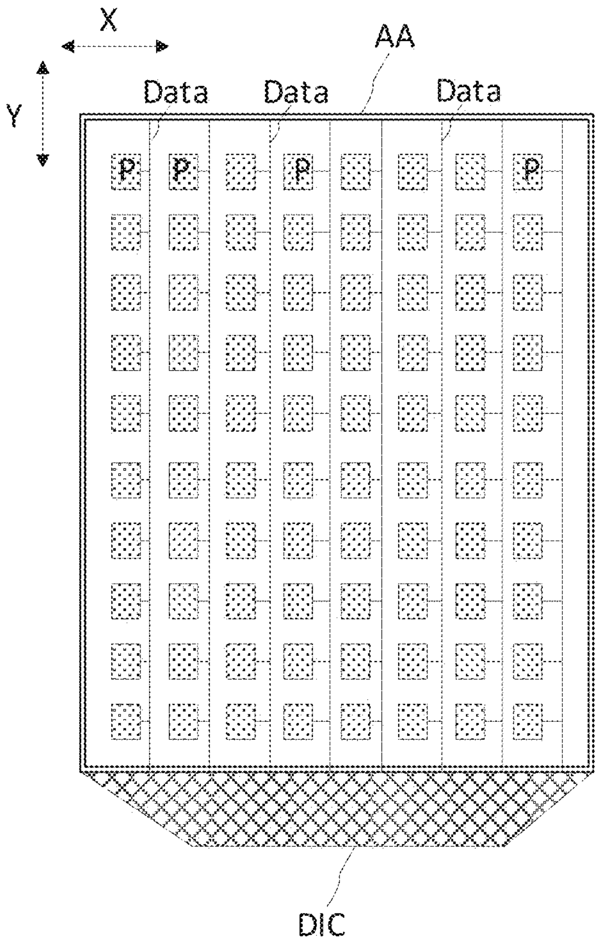
FIG. 1 is a schematic diagram of a structure of a display panel according to an embodiment of the present disclosure.

Embodiments will now be described more fully with reference to the accompanying drawings. However, the embodiments can be implemented in a variety of forms and should not be construed as being limited to the embodiments set forth herein; rather, the provision of these embodiments makes the present disclosure comprehensive and complete and conveys the concepts of the embodiments to those skilled in the art in a comprehensive manner. The same reference numerals in the drawings indicate the same or similar structures, and thus their detailed description will be omitted. In addition, the accompanying drawings are only schematic illustrations of the present disclosure and are not necessarily drawn to scale.

Figure 2:
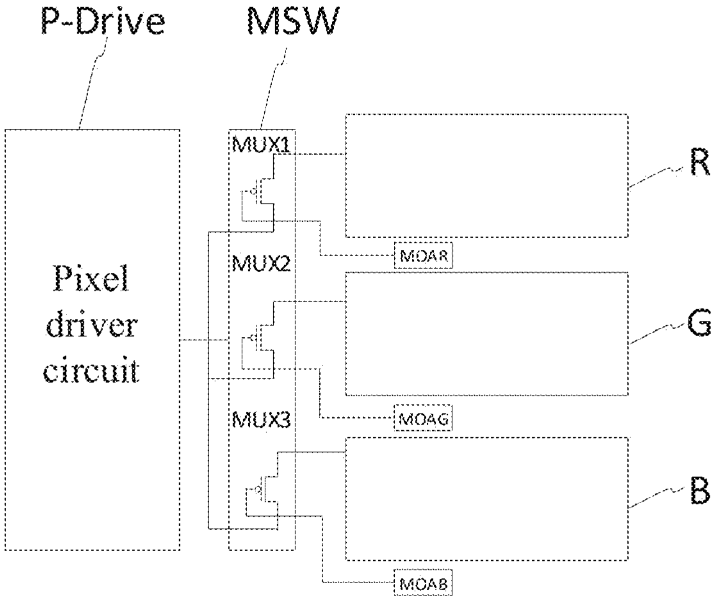
FIG. 2 is a schematic diagram of a structure of one pixel unit in FIG. 1.

FIG. 1 is a schematic diagram of a structure of a display panel according to an embodiment of the present disclosure, and FIG. 2 is a schematic diagram of a structure of one pixel unit in FIG. 1. As shown in FIGS. 1 and 2, the display panel may include a plurality of pixel units distributed in an array along a row direction X and a column direction Y. The pixel unit may include a pixel driver circuit P-Drive, a plurality of sub-pixels, and a switching circuit MSW. The pixel driver circuit P-Drive is used to provide a driving current. A first electrode P-AOD of the sub-pixel is used to be connected to the pixel driver circuit P-Drive, a second electrode P-CTO of the sub-pixel is connected to a second power supply terminal, and the sub-pixel emits light under the action of the driving current. The switching circuit MSW may include a plurality of switching units. The switching units are arranged in correspondence with the sub-pixels. The switching unit is connected in series between the pixel driver circuit P-Drive and the corresponding sub-pixel, a control end of the switching unit is used to receive a switching signal, a first end of the switching unit is connected to the pixel driver circuit P-Drive, a second end of the switching unit is connected to the second electrode P-CTO of the corresponding sub-pixel, and the switching unit conducts a communication path between the sub-pixel and the pixel driver circuit P-Drive in response to the switching signal.

The present disclosure provides a display panel that includes a plurality of sub-pixels and a pixel driver circuit P-Drive in a pixel unit, the plurality of sub-pixels being connected to the pixel driver via a switching circuit MSW arranged, such that the plurality of sub-pixels in the pixel unit multiplex a pixel driver circuit P-Drive via the switching circuit MSW. In addition, the connection between the pixel driver circuit P-Drive and the sub-pixel can be switched by each switching unit in the switching circuit MSW in response to a corresponding switching signal, and the pixel driver circuit P-Drive can provide a corresponding driving current to the connected sub-pixel in accordance with a set timing to realize a normal display of the display panel. In the present disclosure, a plurality of sub-pixels in a pixel unit multiplex a pixel driver circuit P-Drive, which can reduce the space occupied by a single pixel unit, and thus can increase the number of pixels that can be laid out in the display area, i.e., increase the pixel density.

In the present disclosure, the sub-pixels in the pixel unit are set to share the same pixel driver circuit P-Drive, and the switching circuit MSW performs conduction (on/off) switching between the sub-pixels and the pixel driver circuit P-Drive, which can greatly reduce the space occupied by the pixel unit and thus increase the pixel layout density of the display area because the switching unit in the switching circuit MSW occupies a much smaller space than that of a single pixel driver circuit P-Drive. Compared to a structure of a display panel in which one sub-pixel corresponds to one pixel driver circuit P-Drive, the overall occupied area of a single pixel unit in the display panel of the present disclosure can be reduced by more than 30%, and it is clear that the pixel density in the display panel of the present disclosure can be greatly increased.

As shown in FIG. 2, in the embodiment, the number of switching units included in the switching circuit MSW in each pixel unit may be the same as the number of sub-pixels in the pixel unit. Generally, one pixel unit may include a first sub-pixel, a second sub-pixel, and a third sub-pixel, and the first sub-pixel may be, for example, an R pixel, the second sub-pixel may be, for example, a G pixel, and the third sub-pixel may be, for example, a B pixel, and accordingly, the switching circuit MSW may include a first switching unit MUX1, a second switching unit MUX2, and a third switching unit MUX3. The first switching unit MUX1 is serially connected between the first sub-pixel and the pixel driver circuit P-Drive, the second switching unit MUX2 is serially connected between the second sub-pixel and the pixel driver circuit P-Drive, and the third switching unit MUX3 is serially connected between the third sub-pixel and the pixel driver circuit P-Drive, and each of the switching units conducts a communication path of the corresponding sub-pixel and the pixel driver circuit P-Drive in response to a switching signal it obtains. Exemplarily, when the first switching unit MUX1 obtains a first switching signal, a connection is established between the first sub-pixel and the pixel driver circuit P-Drive, at which time the pixel driver circuit P-Drive may provide a driving current to the first sub-pixel under the action of the current data signal to drive the first sub-pixel to emit light for display. When the second switching unit MUX2 obtains a second switching signal, a connection is established between the second sub-pixel and the pixel driver circuit P-Drive, at which time the pixel driver circuit P-Drive may provide a driving current to the second sub-pixel under the action of the current data signal to drive the second sub-pixel to emit light for display. Similarly, when the third switching unit MUX3 obtains a third switching signal, a connection is established between the third sub-pixel and the pixel driver circuit P-Drive, at which time the pixel driver circuit P-Drive may provide a driving current to the third sub-pixel under the action of the corresponding data signal to drive the third sub-pixel to emit light for display.

In the embodiment, as shown in FIG. 1, in the same pixel unit, an orthographic projection of the pixel driver circuit P-Drive on the base substrate is disposed on a side of an orthographic projection of the first electrode P-AOD of the sub-pixel on the base substrate away from an orthographic projection of the second electrode P-CTO of the sub-pixel on the base substrate, and an orthographic projection of the switching unit on the base substrate is disposed between an orthographic projection of the first electrode P-AOD of the corresponding sub-pixel on the base substrate and an orthographic projection of the second electrode P-CTO of the corresponding sub-pixel on the base substrate. For example, the pixel unit may include a first sub-pixel, a second sub-pixel, and a third sub-pixel, and the first sub-pixel, the second sub-pixel, and the third sub-pixel may be arranged in the column direction Y. The switching circuit MSW may include a first switching unit MUX1, a second switching unit MUX2, and a third switching unit MUX3 which are arranged in the column direction Y and correspond to the three sub-pixels, respectively. The first switching unit MUX1 is connected to the first sub-pixel, and accordingly, an orthographic projection of the first switching unit MUX1 on the base substrate may be located between an orthographic projection of a first electrode P-AOD of the first sub-pixel on the base substrate and an orthographic projection of a second electrode P-CTO of the first sub-pixel on the base substrate. The second switching unit MUX2 is connected to the second sub-pixel, and accordingly, an orthographic projection of the second switching unit MUX2 on the base substrate may be located between an orthographic projection of a first electrode P-AOD of the second sub-pixel on the base substrate and an orthographic projection of a second electrode P-CTO of the second sub-pixel on the base substrate. The third switching unit MUX3 is connected to the third sub-pixel, and accordingly, an orthographic projection of the third switching unit MUX3 on the base substrate may be located between an orthographic projection of a first electrode P-AOD of the third sub-pixel on the base substrate and an orthographic projection of a second electrode P-CTO of the third sub-pixel on the base substrate. The pixel driver circuit P-Drive is located on a side of the first electrode away from the second electrode. The first electrode P-AOD may, for example, be an anode and the second electrode P-CTO may, for example, be a cathode. Of course, the first electrode P-AOD may also be a cathode and the second electrode P-CTO may be an anode, which is not limited by the present disclosure. By setting the pixel driver circuit P-Drive, the switching unit, and the sub-pixels in the pixel unit in a relationship as described above, the space occupied by the sub-pixels can be further saved, which is conducive to further improving the pixel density of the display area.

It should be understood that the orthographic projection of the pixel driver circuit P-Drive on the base substrate described in the present disclosure can be understood as the orthographic projection of the layout structure for forming each component in the pixel driver circuit P-Drive on the base substrate. Similarly, the orthographic projection of the switching unit on the base substrate may be understood as the orthographic projection of the layout structure for forming the switching unit on the base substrate.

In the embodiment, the switching circuit MSW may be controlled by the switching signal output from a switch driving circuit MOA. The switch driving circuit MOA may include a plurality of cascaded third shift register units. Each third shift register unit provides the switching signal to the switching units in the pixel row corresponding to it, and the plurality of shift register units are cascaded such that the switch driving circuit MOA provides the switching signals to the switching units in each row in turn.

Exemplarily, as shown in FIG. 2, the pixel unit may include three sub-pixels, and the switch driving circuit MOA may include a first sub-switch driving circuit MOAR, a second sub-switch driving circuit MOAG, and a third sub-switch driving circuit MOAB. The first sub-switch driving circuit MOAR may be used to provide a corresponding switching signal to the first switching unit MUX1 to control the connection between the first sub-pixel and the pixel driver circuit P-Drive. The second sub-switch driving circuit MOAG may be used to provide a corresponding switching signal to the second switching unit MUX2 to control the connection between the second sub-pixel and the pixel driver circuit P-Drive. The third sub-switch driving circuit MOAB may be used to provide a corresponding switching signal to the third switching unit MUX3 to control the connection of the third sub-pixel to the pixel driver circuit P-Drive. The first sub-switch driving circuit MOAR, the second sub-switch driving circuit MOAG, and the third sub-switch driving circuit MOAB all include a plurality of cascaded third shift register units. The third shift register unit in the first sub-switch driving circuit MOAR is used to provide a first switching signal to a first switching unit MUX1 in a row corresponding to this third shift register unit to control the connection between the first sub-pixel of the corresponding row and the pixel driver circuit P-Drive. The third shift register unit in the second sub-switch driving circuit MOAG is used to provide a second switching signal to a second switching unit MUX2 in a row corresponding to this third shift register unit to control the connection between the second sub-pixel of the corresponding row and the pixel driver circuit P-Drive. The third shift register unit in the third sub-switch driving circuit MOAB is used to provide a third switching signal to a third switching unit MUX3 in a row corresponding to this third shift register unit to control the connection between the third sub-pixel of the corresponding row and the pixel driver circuit P-Drive.

Figure 3:
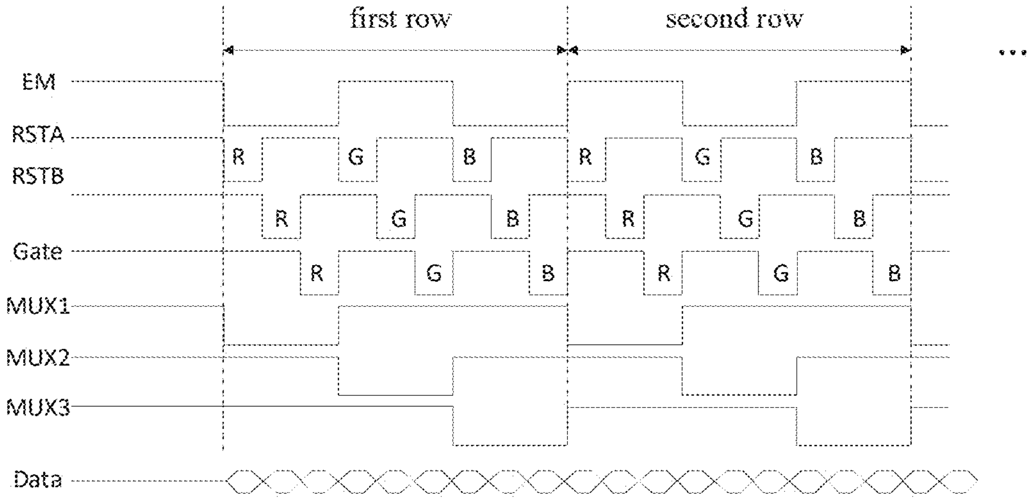
FIG. 3 is a drive timing diagram according to an embodiment of the present disclosure.

FIG. 3 is a drive timing diagram according to an embodiment of the present disclosure. As shown in FIG. 3, the switch driving circuit MOA may connect each sub-pixel of each row to the pixel driver circuit P-Drive in sequence in a manner of outputting switching signals row by row, and at a time when the switch driving circuit MOA outputs the switching signal, the other driving circuits in the display panel provide a reset signal, a gate control signal and an enable control signal to the pixel driver circuit P-Drive to enable the pixel driver circuit P-Drive to provide a driving current to the sub-pixel connected to it, in order to drive the connected sub-pixel to emit light for display.

For example, the first sub-switch driving circuit MOAR of the first row may first output a first switching signal to turn on all the first switching units MUX1 of the first row, so that each of the first sub-pixels of the first row is connected to a corresponding pixel driver circuit P-Drive, and, at the same time, a third driving circuit RST GOA, a first driving circuit Gated GOA, and a second driving circuit EM GOA in the display panel may sequentially provide a reset signal, a gate control signal, and an enable signal to the pixel drive circuits P-Drive of the first row, and the pixel driver circuits P-Drive provide driving currents to the first sub-pixels of the first row in response to the above-described signals, so that each of the first sub-pixels of the first row emits light for display during an effective time of the first switching signal. Then, the second sub-switch driving circuit MOAG of the first row outputs a second switching signal to turn on all the second switching units MUX2 of the first row to connect the second sub-pixels of the first row to the corresponding pixel driver circuits P-Drive, and during the second switching signal, the above-described process is repeated for the third driving circuit RST GOA, the first driving circuit Gate GOA, and the second driving circuit EM GOA to output the reset signal, the gate control signal, and the enable signal, respectively, so that at this time, the pixel driver circuits P-Drive of the first row can provide driving currents to the second sub-pixels to drive the second sub-pixels of the first row to emit light for display. Then, the third sub-switch driving circuit MOAB of the first row outputs a thirdswitching signal to turn on all the third switching units MUX3 of the first row to connect the pixel driver circuits P-Drive of the first row to the third sub-pixels, and the third driving circuit RST GOA, the first driving circuit Gate GOA, and the second driving circuit EM GOA of the display panel respectively output the reset signal, the gate control signal and the enable signal in sequence, and at this time, the pixel driver circuit P-Drive of the first row can provide driving currents to the third sub-pixels to drive the third sub-pixels of the first row to emit light for display. Thereafter, the switch driving circuit MOA, the third driving circuit RST GOA, the first driving circuit Gate GOA, and the second driving circuit EM GOA repeat the signal output process described above, respectively, to light up the first sub-pixels, the second sub-pixels, and the third sub-pixels row by row and time-sharing.

As can be seen that, in the present disclosure, the display panel of the present disclosure can be driven to emit light for display by increasing the operating frequency of the third driving circuit RST GOA, the first driving circuit Gate GOA, and the second driving circuit EM GOA, and by outputting corresponding switching signals from the set switch driving circuit MOA, i.e., normal light-emitting display of the display panel can be realized under the structure in which the PPI of the pixels is increased. It should be understood that in other embodiments, the display panel may also be provided with other driving methods, and based on the other driving methods, the display panel of the present disclosure may also be driven to display normally.

Figure 4:
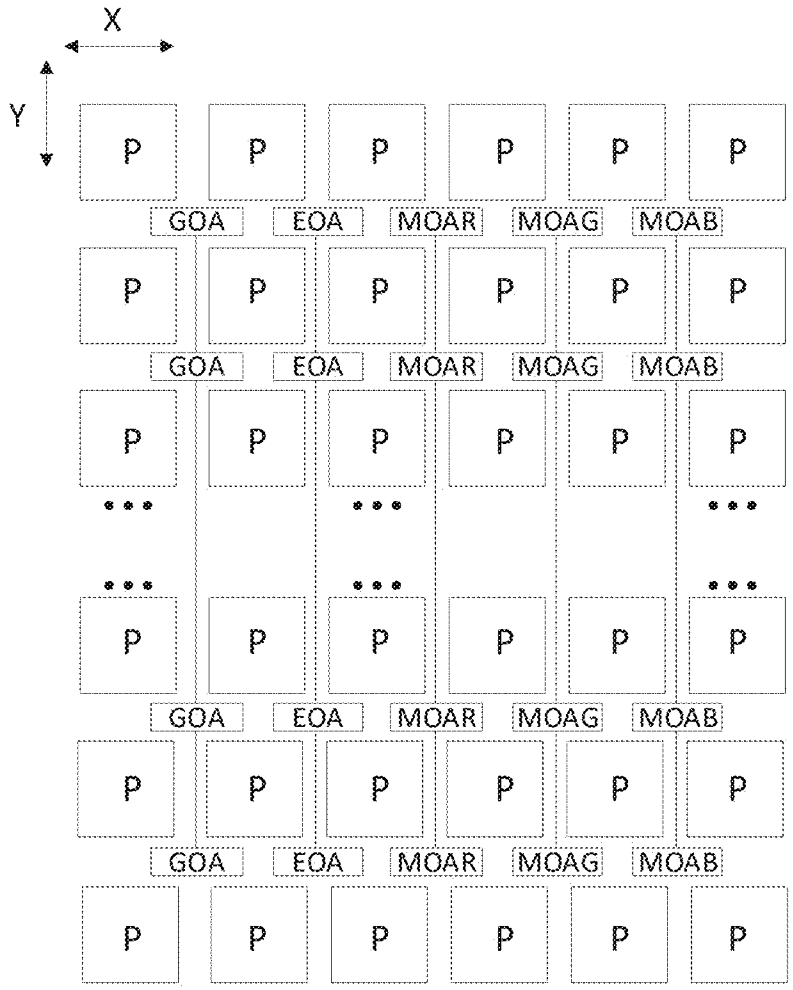
FIG. 4 is a schematic diagram of a structure of a display panel according to an embodiment of the present disclosure.

FIG. 4 is a schematic diagram of a structure of a display panel according to an embodiment of the present disclosure. As shown in FIG. 4, the switch driving circuit MOA may include a first sub-switch driving circuit MOAR, a second sub-switch driving circuit MOAG, and a third sub-switch driving circuit MOAB, and each sub-switch driving circuit may include a plurality of cascaded third shift register units. Each of the third shift register units may be provided in a gap between two adjacent rows of pixels, whereby each of the third shift register units does not need to take up additional space in the display area, and the PPI of the display panel can be improved by utilizing the existing space in the display area.

For example, as described above, the display panel typically includes a third driving circuit RST GOA, a first driving circuit Gate GOA, and a second driving circuit EM GOA, each of which includes a plurality of cascaded shift register units, and the shift register units of the respective driving circuits are distributed between two adjacent rows of pixels. It could be known that a driving circuit has only one or a few columns of shift register units, which is much less than the number of columns of pixels in the display panel, and thus most of the gaps between two adjacent rows in the pixel columns are unused, and in the present disclosure, these existing unoccupied inter-row gaps can be used to place all the cascaded shift register units of the switch driving circuits MOA, so as to eliminate the need to occupy additional space in the display area and improve the utilization of space in the display area. This structure is particularly suitable for splicing screen display products, which have only the display area, and this layout can utilize the existing space so that the switch driving circuits MOA do not need to occupy other display space.

Figure 5:
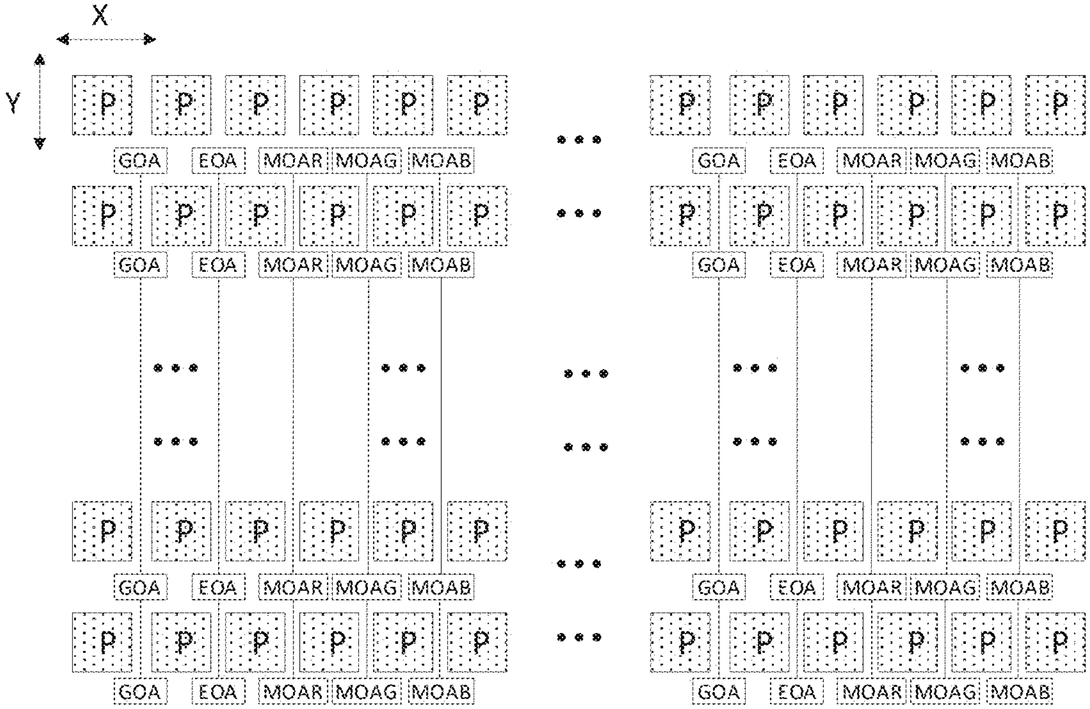
FIG. 5 is a schematic diagram of a structure of a display panel according to another embodiment of the present disclosure.

FIG. 5 is a schematic diagram of a structure of a display panel according to another embodiment of the present disclosure. As shown in FIG. 5, in the embodiment, the display panel may include two switch driving circuits MOA, and the two switch driving circuits MOA are disposed separately on two sides of the display area. For example, one switch driving circuit MOA is disposed on the left side of the display area, and the other switch driving circuit MOA is disposed on the right side of the display area. The advantage of such a setting is that by separately disposing the switch driving circuits MOA on two sides of the display area, the distance between a single switch driving circuit MOA and a switching unit connected to thereto at a distal end can be reduced, and thus the line loss of the corresponding switching signals on the transmission line can be reduced. It should be understood that in the case where the display panel includes two switch driving circuits MOA, each switch driving circuit MOA has the structure described above and will not be described in detail herein. In addition, in other embodiments, three or more switch driving circuits MOA may be provided, all of which fall within the scope of protection of the present disclosure.

Figure 6:
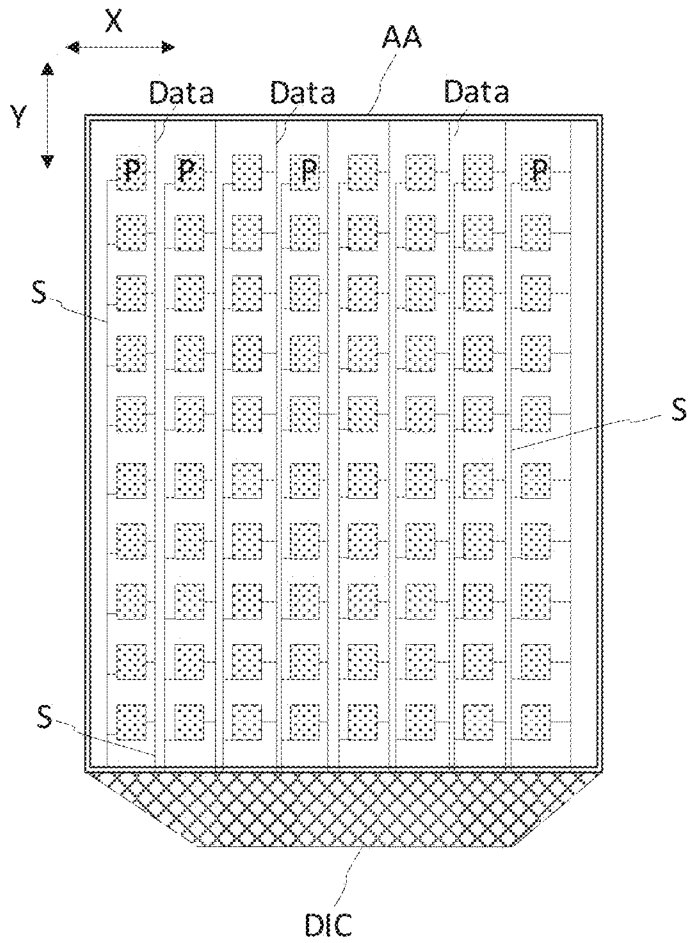
FIG. 6 is a schematic diagram of a structure of a display panel according to an embodiment of the present disclosure.

In some embodiments, the switching circuit MSW may be driven by time-sharing without the switch driving circuit MOA. For example, a driver integrated circuit DIC may output a corresponding switching signal to control the time-sharing conduction of each switching unit in the switching circuit MSW. Exemplarily, FIG. 6 is a schematic diagram of a structure of a display panel according to an embodiment of the present disclosure. As shown in FIG. 6, the driver integrated circuit DIC may be disposed on a side of the display area along the column direction Y, and the driver integrated circuit DIC may output a switching signal to the switching circuit MSW via a signal line S. As described above, the switching circuit MSW may include a first switching unit MUX1, a second switching unit MUX2, and a third switching unit MUX3. In a frame of data, the driver integrated circuit DIC may first provide first switching signals to all of the first switching units MUX1 in the display panel to connect all of the first sub-pixels to the corresponding pixel driver circuits P-Drive, so that the corresponding pixel driver circuits provide the driving currents to the first sub-pixels to drive the first sub-pixels to emit light for display. Then, the driver integrated circuit DIC provides second switching signals to all the second switching units MUX2 in the display panel to connect all the second sub-pixels to the corresponding pixel driver circuits P-Drive, so that the corresponding pixel driver circuits P-Drive provide the driving currents to the second sub-pixels to drive the second sub-pixels to emit light for display. Finally, the driver integrated circuit DIC may provide third switching signals to all of the third switching units MUX3 in the display panel to connect all of the third sub-pixels to the corresponding pixel driver circuits P-Drive, so that the corresponding pixel driver circuits P-Drive provide driving currents to the third sub-pixels to drive the third sub-pixels to emit light for display.

Figure 7:
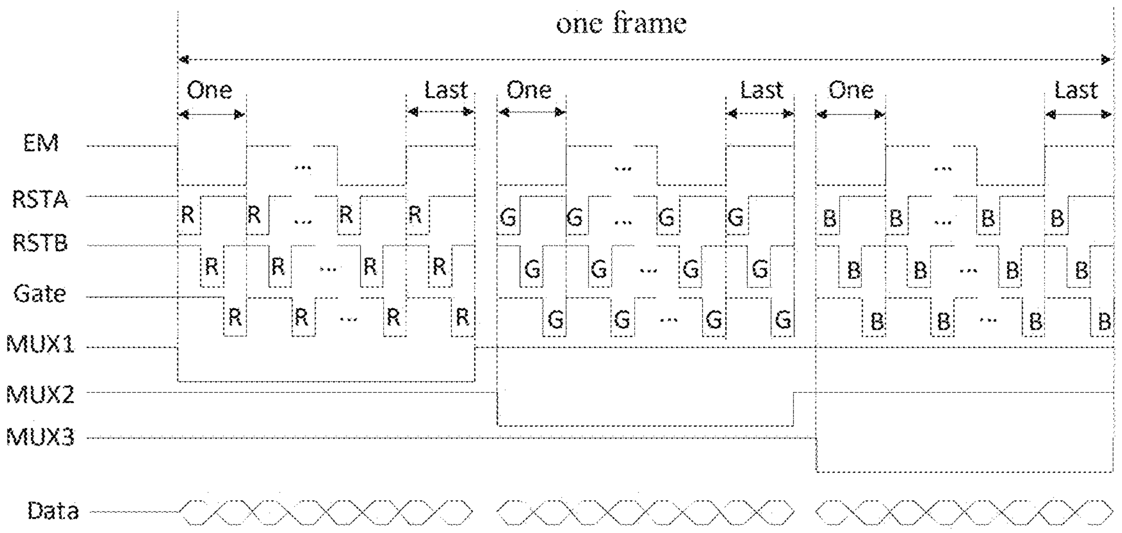
FIG. 7 is a drive timing diagram according to another embodiment of the present disclosure.

Exemplarily, FIG. 7 is a drive timing diagram according to another embodiment of the present disclosure. As shown in FIG. 7, in a frame of data, the driver integrated circuit DIC successively outputs a first switching signal, a second switching signal, and a third switching signal. The first switching signal is used to turn on all of the first switching units MUX1 in the display panel to connect the first sub-pixel in each pixel unit to the pixel driver circuit P-Drive in that pixel unit. The second switching signal is used to turn on all the second switching units MUX2 in the display panel to connect the second sub-pixel in each pixel unit to the pixel driver circuit P-Drive in that pixel unit. The third switching signal is used to turn on all the third switching units MUX3 in the display panel to connect the third sub-pixel in each pixel unit to the pixel driver circuit P-Drive in that pixel unit.

As shown in FIG. 7, the driver integrated circuit DIC first outputs a first switching signal, and during the time when the driver integrated circuit DIC outputs the first switching signal, all the first sub-pixels in the display panel are connected to the corresponding pixel driver circuits P-Drive, and during this process, the second driving circuit EM GOA, the third driving circuit RST GOA, and the first driving circuit Gate GOA in the display panel sequentially provide an enable signal, a reset signal, and a gate control signal to the pixel driver circuits P-Drive, and each of the pixel driver circuits P-Drive provides a driving current to the first sub-pixel of the present pixel unit where the pixel driver circuit P-Drive is located to drive the first sub-pixel of the present pixel unit to emit light for display. Then, the driver integrated circuit DIC outputs a second switching signal, and during the time when the driver integrated circuit DIC outputs the second switching signal, the second switching unit MUX2 in each switching circuit MSW is turned on, and all the second sub-pixels in the display panel are connected to the corresponding pixel driver circuits P-Drive, and the second driving circuit EM GOA, the third driving circuit RST GOA, and the first driving circuit Gate GOA sequentially output an enable signal, a reset signal, and a gate control signal, respectively, and each of the pixel drive circuits P-Drive provides a driving current to the connected second sub-pixel to drive the second sub-pixel to emit light for display. Finally, the driver integrated circuit DIC outputs a third switching signal, at which time the third switching unit MUX3 in each switching circuit MSW is turned on, all the third sub-pixels in the display panel are connected to the corresponding pixel driver circuits P-Drive, and the second driving circuit EM GOA, the third driving circuit RST GOA, and the first driving circuit Gate GOA sequentially output an enable signal, a reset signal, and a gate control signal, respectively, and each pixel driver circuit P-Drive provides a driving current to the connected third sub-pixel to drive the third sub-pixel connected thereto to emit light for display. As can be seen, the difference from the MOA driving method described above is that the driver integrated circuit DIC outputs three switching signals in a time-sharing manner, and within each switching signal time, the corresponding sub-pixels are charged for display, so that the three types of sub-pixels are displayed in a time-sharing manner. For example, if the first sub-pixel is an R pixel, the second sub-pixel is a G pixel, and the third sub-pixel is a B pixel, in the embodiment, the driver integrated circuit DIC first controls all of the R pixels in the display panel to be displayed in one frame time, then controls all of the G pixels to be displayed, and finally controls all of the B pixels to be displayed. In the embodiment, the second driving circuit EM GOA, the third driving circuit RST GOA, and the first driving circuit Gate GOA may be disposed on two sides of the display area without occupying the space of the display area, and the driver integrated circuit DIC that outputs the switching signals also does not occupy the display space, so that the pixel density of the display area may be further increased to realize a higher PPI.

As shown in FIG. 7, the duration of the first switching signal, the second switching signal, and the third switching signal may be the same in a frame of data. That is, the driver integrated circuit DIC controls all the first sub-pixels to be displayed in the first one-third of a frame of data, all the second sub-pixels to be displayed in the middle one-third of a frame of data, and all the third sub-pixels to be displayed in the last one-third of a frame of data. Therefore, in one frame of data, the three types of sub-pixels are displayed for the same length of time, and this light-emitting display method can improve display uniformity, solve the problem of the display color cast, and improve the display effect. It will be understood that, within the effective duration of each switching signal, the second driving circuit EM GOA, the third driving circuit RST GOA, and the first driving circuit Gate GOA need to output an enable signal, a reset signal, and a gate control signal to the pixel driver circuit P-Drive in turn, and thus the frequency of driving signals output by the second driving circuit EM GOA, the third driving circuit RST GOA, and the first driving circuit Gate GOA is three times the frequency of the switching signal output by the driver integrated circuit DIC.

Figure 8:
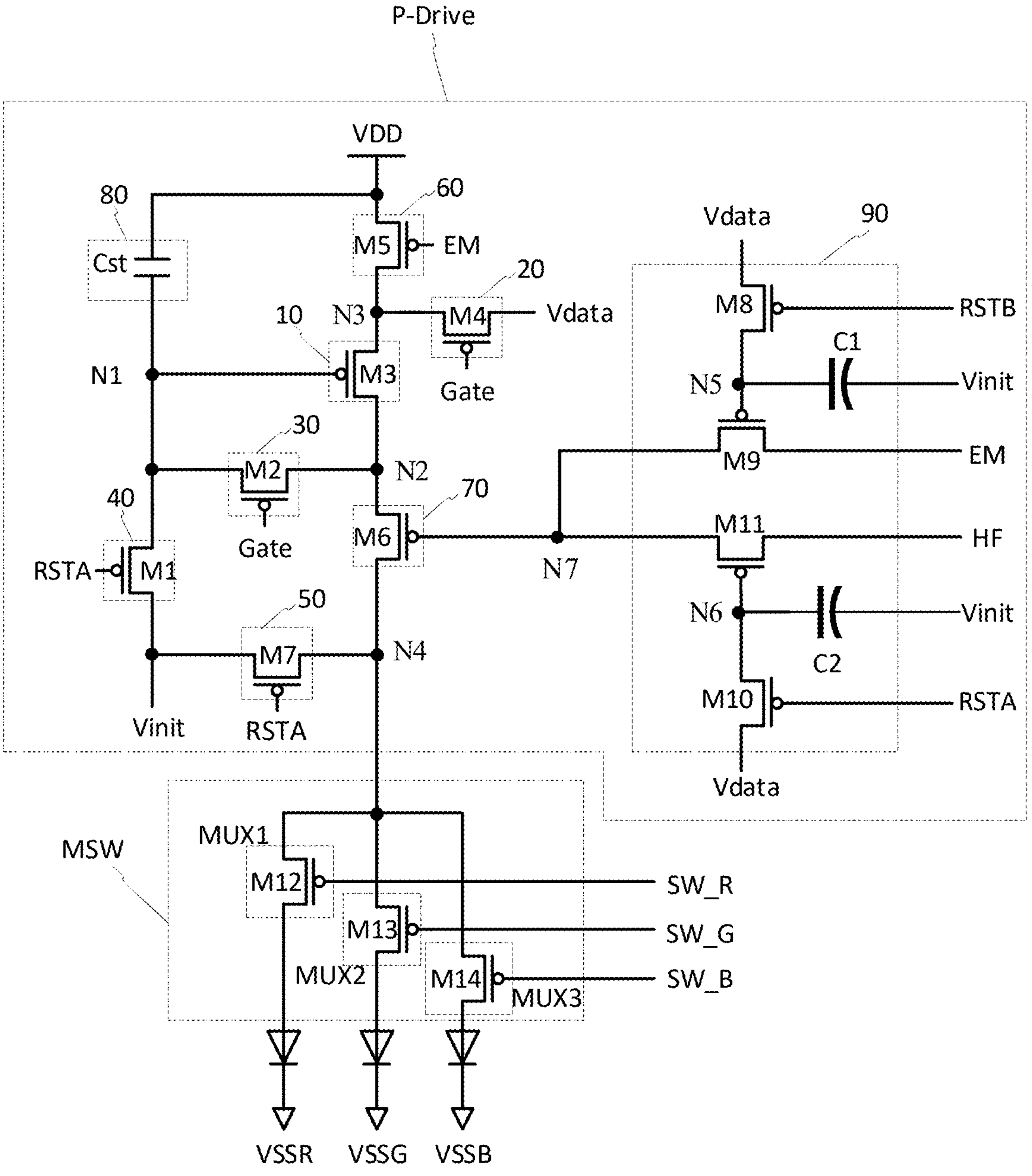
FIG. 8 is an equivalent circuit diagram of a pixel driver circuit according to an embodiment of the present disclosure.

FIG. 8 is an equivalent circuit diagram of a pixel driver circuit according to an embodiment of the present disclosure. As shown in FIG. 8, the pixel driver circuit P-Drive may include a driver device 10, a first reset device 40, a transmission device 30, a data writing device 20, a second reset device 50, a first light-emitting control device 60, a second light-emitting control device 70, a storage device 80, and an adjustment device 90. The driver device 10 is connected to a first node N1, a second node N2, and a third node N3, and the driver device 10 is used to provide, in response to a voltage signal from the first node N1, a driving current utilizing a voltage difference between the second node N2 and the third node N3. The first reset device 40 is connected to the first node N1, a first reset signal terminal, and an initial signal terminal, and the first reset device 40 is used to transmit an initial signal from the initial signal terminal to the first node N1 in response to a reset signal from the first reset signal terminal. The transmission device 30 is connected to the first node N1, a gate signal terminal Gate, and the second node N2, and the transmission device 30 is used to conduct a communication path between the first node N1 and the second node N2 in response to a signal from the gate signal terminal Gate. The data writing device 20 is connected to a data signal terminal Vdata, the gate signal terminal Gate and the third node N3, and the data writing device 20 is used to transmit a second data signal from the data signal terminal Vdata to the third node N3 in response to the signal from the gate signal terminal Gate. The second reset device 50 is connected to a fourth node N4, the initial signal terminal Vinit, and the first reset signal terminal RSTA, and the second reset device 50 is used to transmit the initial signal from the initial signal terminal Vinit to the fourth node N4 in response to the reset signal of the first reset signal terminal RSTA. The first light-emitting control device 60 is connected to the third node N3, an enable signal terminal EM and a first power supply terminal VDD, and the first light-emitting control device 60 is used to conduct a communication path between the third node N3 and the first power supply terminal VDD in response to an enable signal from the enable signal terminal EM. The second light-emitting control device 70 is connected to the second node N2, fourth node N4 and the adjustment device 90, and the second light-emitting control device 70 is used to conduct a communication path between the fourth node N4 and the second node N2 in response to an output signal from the adjustment device 90. The adjustment device 90 is connected to the data signal terminal Vdata, a second reset signal terminal RSTB, the first reset signal terminal RSTA, the initial signal terminal Vinit, and the enable signal terminal EM, and the adjustment device 90 is used to turn off the second light-emitting control device 70 in response to a first data signal from the data signal terminal Vdata, or to turn on the second light-emitting control device 70 in response to a second data signal from the data signal terminal Vdata.

In the embodiment, each functional device in the pixel driver circuit P-Drive may be implemented by a transistor. Exemplarily, as shown in FIG. 8, the driver device 10 may include a driver transistor M3, where a control end of the driver transistor M3 is connected to the first node N1, a first end of the driver transistor M3 is connected to the third node N3, and a second end of the driver transistor M3 is connected to the second node N2. The first reset device 40 may include a first transistor M1, where a control end of the first transistor M1 is connected to the first reset signal terminal RSTA, a first end of the first transistor M1 is connected to the first node N1, and a second end of the first transistor M1 is connected to the initial signal terminal Vinit. The transmission device 30 may include a second transistor M2, where a control end of the second transistor M2 is connected to the gate signal terminal Gate, a first end of the second transistor M2 is connected to the first node N1, and a second end of the second transistor M2 is connected to a second node N2. The data writing device 20 may include a fourth transistor M4, where a control end of the fourth transistor M4 is connected to the gate signal terminal Gate, a first end of the fourth transistor M4 is connected to the data signal terminal Vdata, and a second end of the fourth transistor M4 is connected to the third node N3. The second reset device 50 may include a seventh transistor M7, where a control end of the seventh transistor M7 is connected to the first reset signal terminal RSTA, a first end of the seventh transistor M7 is connected to the initial signal terminal Vinit, and a second end of the seventh transistor M7 is connected to the fourth node N4. The first light-emitting control device 60 may include a fifth transistor M5, where a control end of the fifth transistor M5 is connected to the enable signal terminal EM, a first end of the fifth transistor M5 is connected to the first power supply terminal VDD, and a second end of the fifth transistor M5 is connected to the third node N3. The second light-emitting control device 70 may include a sixth transistor M6, where a control end of the sixth transistor M6 is connected to an output end (e.g., the seventh node N7) of the adjustment device 90, a first end of the sixth transistor M6 is connected to the second node N2, and a second end of the sixth transistor M6 is connected to the fourth node N4.

As shown in FIG. 8, the storage device 80 may include a storage capacitor Cst, where a first electrode of the storage capacitor Cst is connected to the first power supply terminal VDD, and a second electrode of the storage capacitor Cst is connected to the first node N1. The storage capacitor Cst may be used to store a voltage signal written to the first node N1.

As shown in FIG. 8, the adjustment device 90 may include an eighth transistor M8, a ninth transistor M9, a tenth transistor M10, and an eleventh transistor M11, as well as a first capacitor C1 and a second capacitor C2. A control end of the eighth transistor M8 is connected to the second reset signal terminal RSTB, a first end of the eighth transistor M8 is connected to the data signal terminal Vdata, a second end of the eighth transistor M8 is connected to the fifth node N5, and the eighth transistor M8 may transmit the data signal from the data signal terminal Vdata to the fifth node N5 in response to the reset signal from the second reset signal terminal RSTB. A control end of the ninth transistor M9 is connected to the fifth node N5, a first end of the ninth transistor M9 is connected to the enable signal terminal EM, a second end of the ninth transistor M9 is connected to the control end of the sixth transistor M6 through the seventh node N7, and the ninth transistor M9 may transmit the enable signal from the enable signal terminal EM to the control end of the sixth transistor M6 in response to a voltage signal from the fifth node N5. A first electrode of the first capacitor C1 is connected to the initial signal terminal Vinit, and a second electrode of the first capacitor C1 is connected to the fifth node N5, and the initial signal output from the initial signal terminal Vinit may reset the first capacitor C1, and the first capacitor C1 may store the voltage signal written to the fifth node N5. A control end of the tenth transistor M10 is connected to the first reset signal terminal RSTA, a first end of the tenth transistor M10 is connected to the data signal terminal Vdata, a second end of the tenth transistor M10 is connected to a sixth node N6, and the tenth transistor M10 may transmit the data signal from the data signal terminal Vdata to the sixth node N6 in response to the reset signal from the first reset signal terminal RSTA. A control end of the eleventh transistor M11 is connected to the sixth node N6, a first end of the eleventh transistor M11 is connected to a high-frequency signal terminal HF, a second end of the eleventh transistor M11 is connected to the control end of the sixth transistor M6 through the seventh node N7, and the eleventh transistor M11 may transmit a voltage signal from the high-frequency signal terminal HF to the control end of the sixth transistor M6 in response to a voltage signal from the sixth node N6. A first electrode of the second capacitor C2 is connected to the initial signal terminal Vinit, and a second electrode of the second capacitor C2 is connected to the sixth node N6, and the initial signal terminal Vinit may reset the second capacitor C2, and the second capacitor C2 may store the voltage signal written to the sixth node N6. The above-described first transistor M1 to the eleventh transistor M11 may be a P-type transistor, for example, may be a P-type low-temperature polycrystalline silicon transistor. Of course, in other embodiments, the eighth transistor M8 to the eleventh transistor M11 may also be an N-type transistor, for example, may be an N-type oxide transistor and the like.

Figure 9:
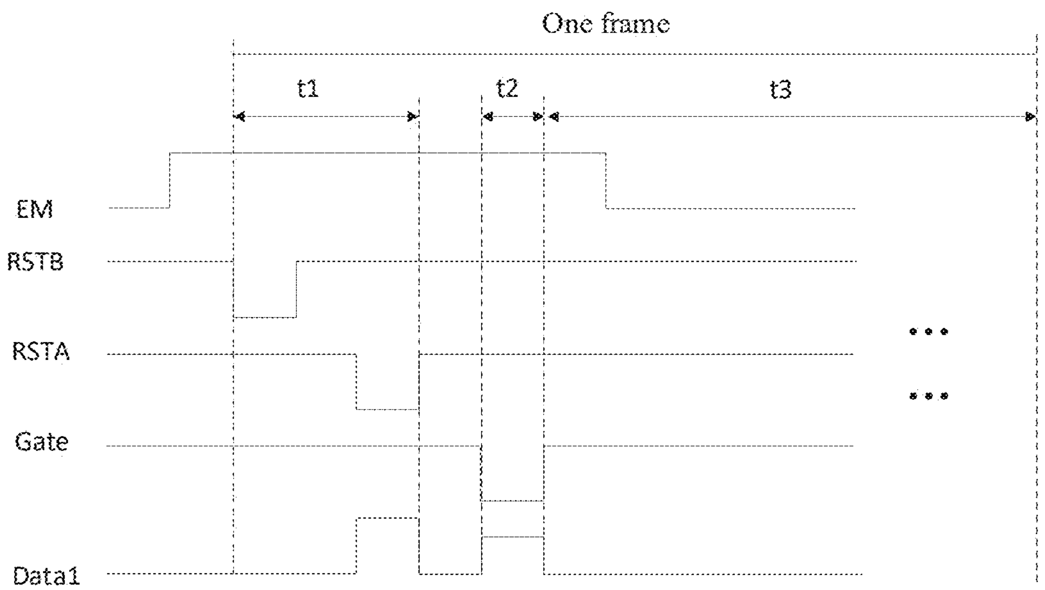
FIG. 9 is a timing diagram of each node in FIG. 8 according to a driving method of the present disclosure.

FIG. 9 is a timing diagram of each node in FIG. 8 according to a driving method of the present disclosure. As shown in FIG. 9, the pixel driver circuit P-Drive may include a reset phase, a compensation phase, and a light-emitting phase.

In the reset phase t1, the second reset signal terminal RSTB outputs a low-level second reset signal to turn on the eighth transistor M8, the data signal terminal Vdata outputs a low-level signal that is transmitted to the fifth node N5 and stored by the first capacitor C1, and the ninth transistor M9 is turned on under the signal from the fifth node N5 in order to write a high-level signal from the enable signal terminal EM to the control end of the sixth transistor M6, and the sixth transistor M6 is turned off. Then, the first reset signal terminal RSTA outputs a first reset signal to turn on the first transistor M1 and the seventh transistor M7, respectively, and the initial signal terminal Vinit outputs an initial signal to reset the first node N1 and the fourth node N4 as well as the first capacitor C1 and the second capacitor C2. Thereafter, the ninth transistor M9 maintains a turn-on state under the low-level signal stored in the first capacitor C1, and the eleventh transistor M11 is turned off.

In the compensation phase t2, the gate signal terminal Gate outputs a low-level gate control signal to turn on the fourth transistor M4, the fourth transistor M4 writes the data signal signal from the data signal terminal Vdata to the third node N3, and writes it to the gate of the driver transistor M3 through the action of the driver transistor M3, in order to realize the compensation of the threshold voltage of the driver transistor M3.

In the light-emitting phase t3, the enable signal terminal EM outputs a low-level signal to turn on the fifth transistor M5, and the low-level signal output from the enable signal terminal EM is written to the gate of the sixth transistor M6 through the ninth transistor M9 to control the sixth transistor M6 to turn on, at which time the switching unit that is turned on connects the first electrode P-AOD of the corresponding sub-pixel to the fourth node N4 so that the sub-pixel is driven to emit light.

Figure 10:
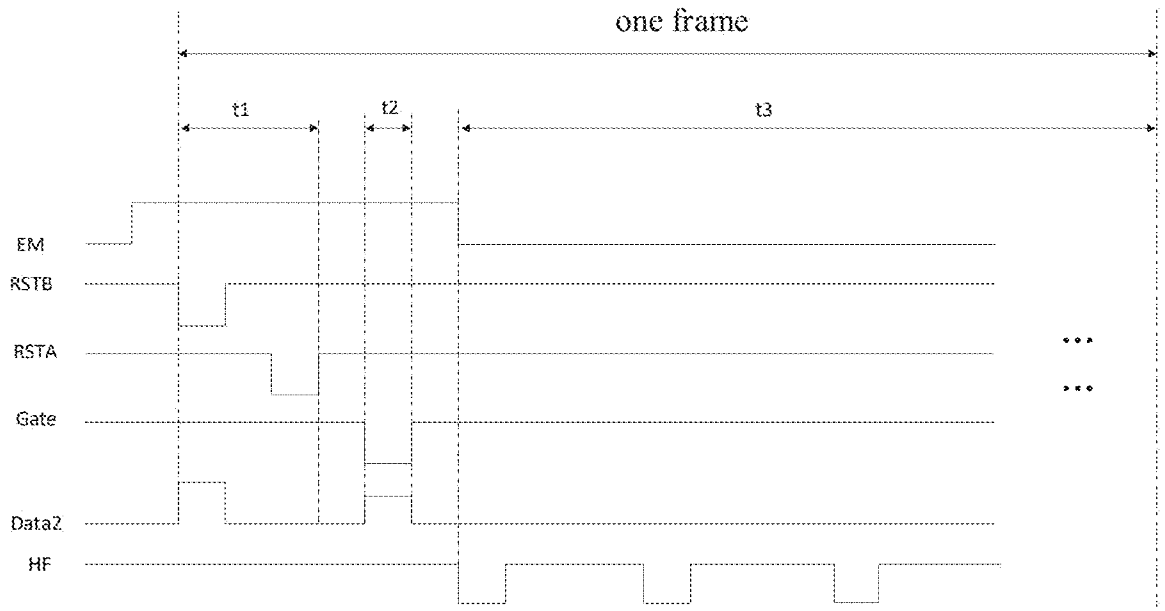
FIG. 10 is a timing diagram of each node in FIG. 8 according to another driving method of the present disclosure.

FIG. 10 is a timing diagram of each node in FIG. 8 according to another driving method of the present disclosure. As shown in FIG. 10, this driving method may also include a reset phase, a compensation phase, and a light-emitting phase.

In the reset phase t1, the second reset signal terminal RSTB outputs a low-level second reset signal to turn on the eighth transistor M8, the data signal terminal Vdata outputs a high-level signal that is transmitted to the fifth node N5, and the ninth transistor M9 is turned off. Then, the first reset signal terminal RSTA outputs a low-level first reset signal to turn on the tenth transistor M10, the data signal terminal Vdata outputs a low-level data signal that is transmitted to the sixth node N6, and the eleventh transistor M11 is turned on under the action of the low-level signal from the sixth node N6. Thereafter, under the action of the low-level signal stored in the second capacitor C2, the eleventh transistor M11 maintains the turn-on state and the ninth transistor M9 is turned off.

In the compensation phase t2, the gate signal terminal Gate outputs a low-level gate control signal to turn on the fourth transistor M4, and the fourth transistor M4 writes the data signal written by the data signal terminal Vdata to the third node N3 and to the first node N1 through the action of the driver transistor M3, in order to realize the threshold voltage compensation for the driver transistor M3.

In the light-emitting phase t3, the enable signal terminal EM outputs a low-level signal to turn on the fifth transistor M5, and the high-frequency signal terminal HF outputs a low-level signal that is transmitted to the gate of the sixth transistor M6 through the eleventh transistor M11, and the sixth transistor M6 is turned on, at which time the switching unit that is turned on connects the first electrode P-AOD of the corresponding sub-pixel to the fourth node N4 so that the sub-pixel is driven to emit light.

Figure 11:
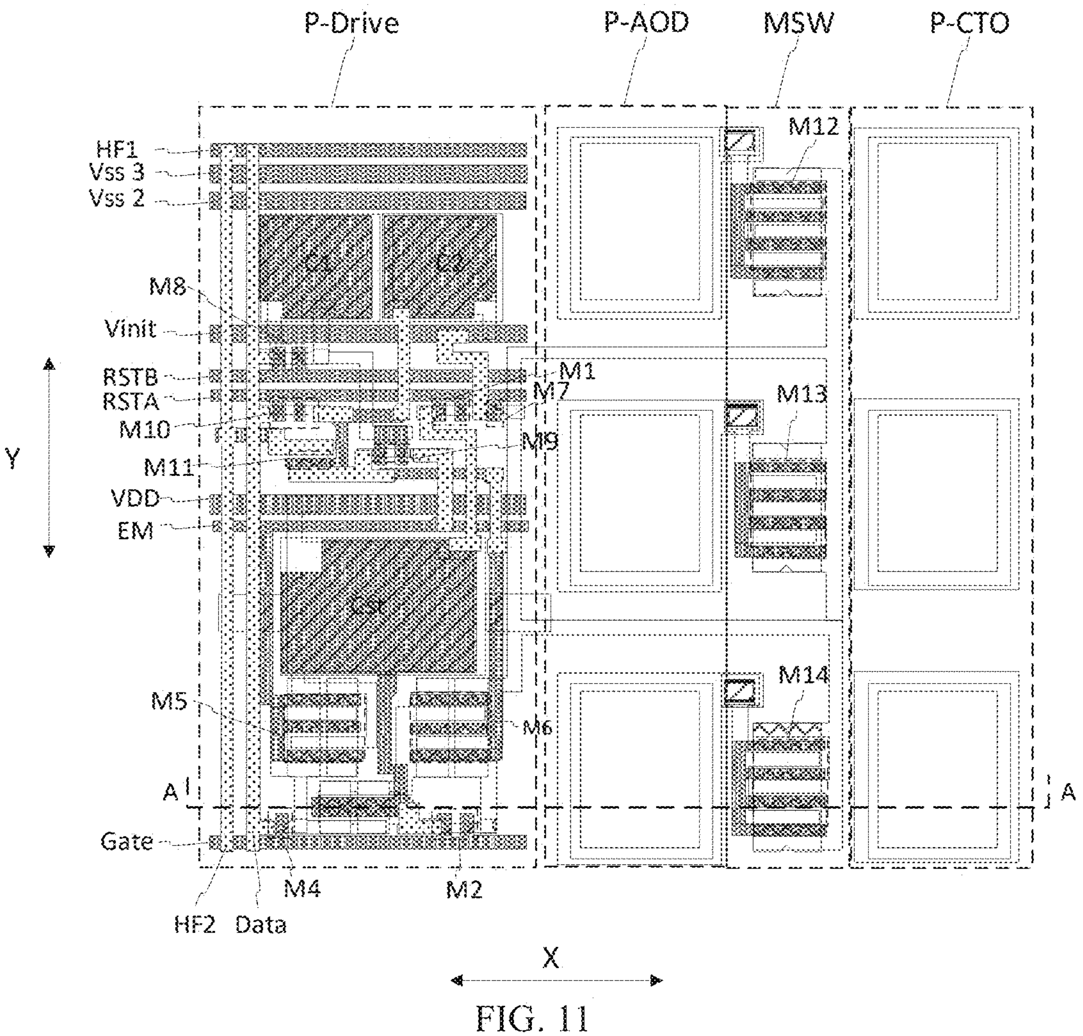
FIG. 11 is a structural layout according to an embodiment of the present disclosure.
Figure 12:
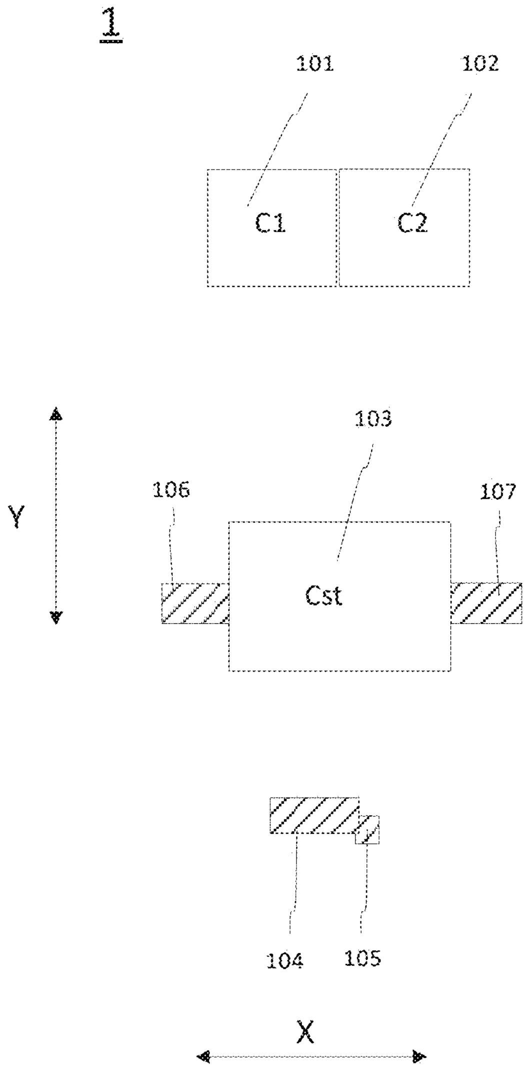
FIG. 12 is a structural layout of a first conductive layer in FIG. 11.
Figure 13:
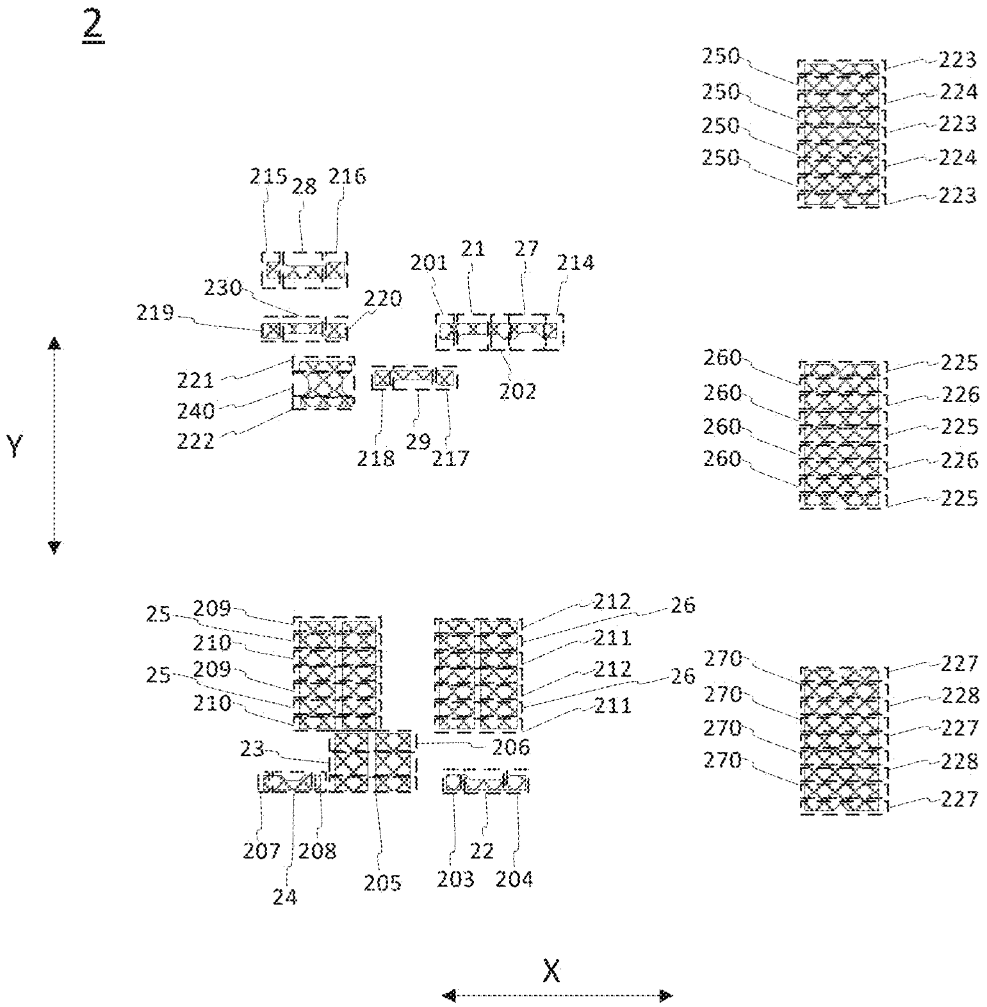
FIG. 13 is a structural layout of an active layer in FIG. 11.
Figure 14:
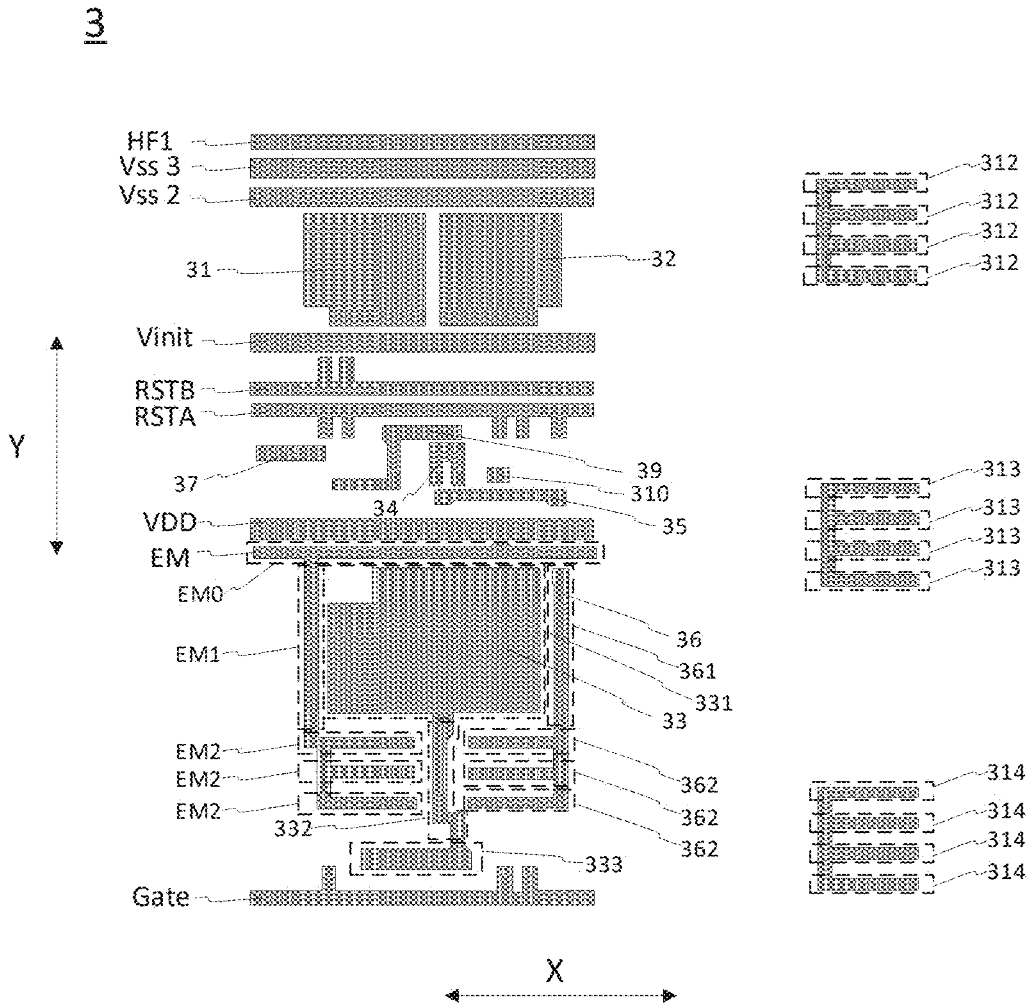
FIG. 14 is a structural layout of a second conductive layer in FIG. 11.
Figure 15:
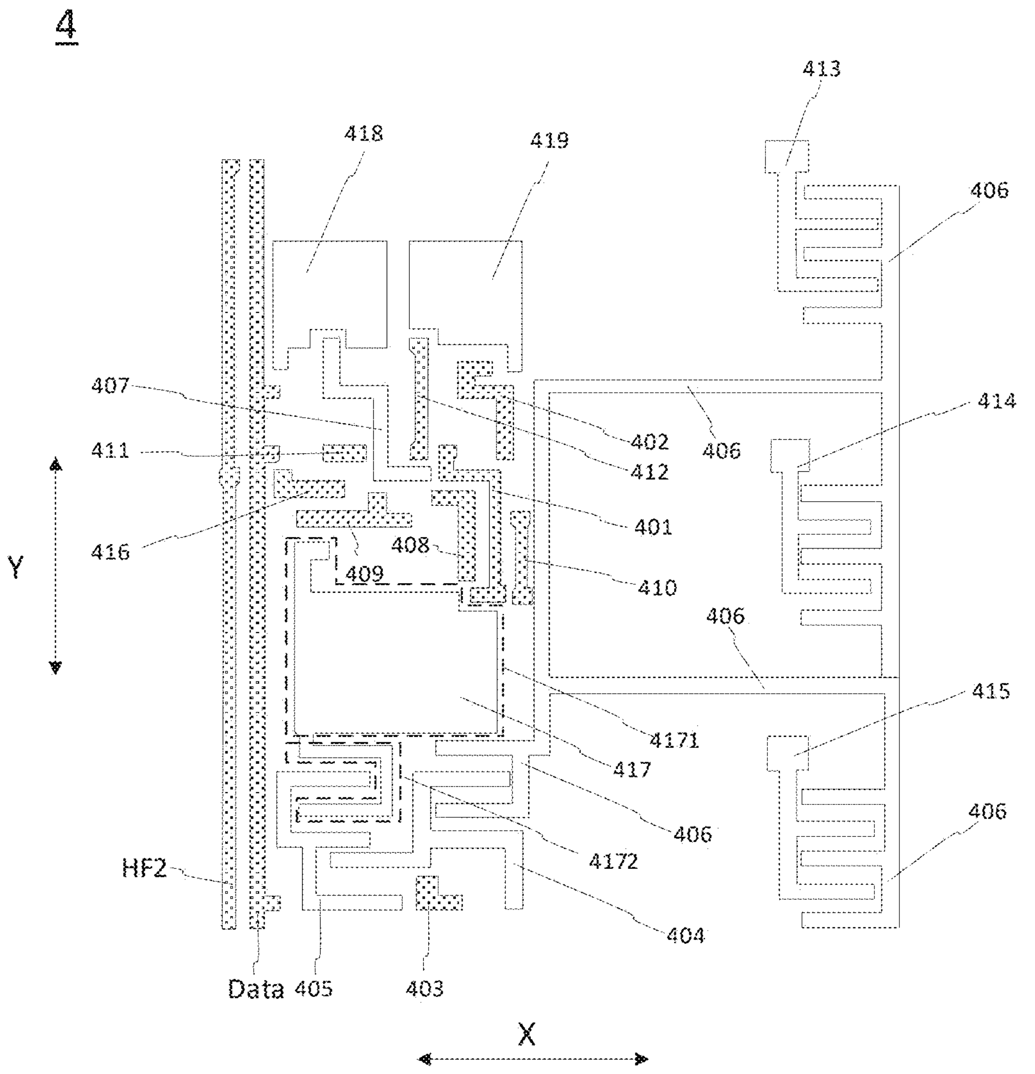
FIG. 15 is a structural layout of a third conductive layer in FIG. 11.
Figure 16:
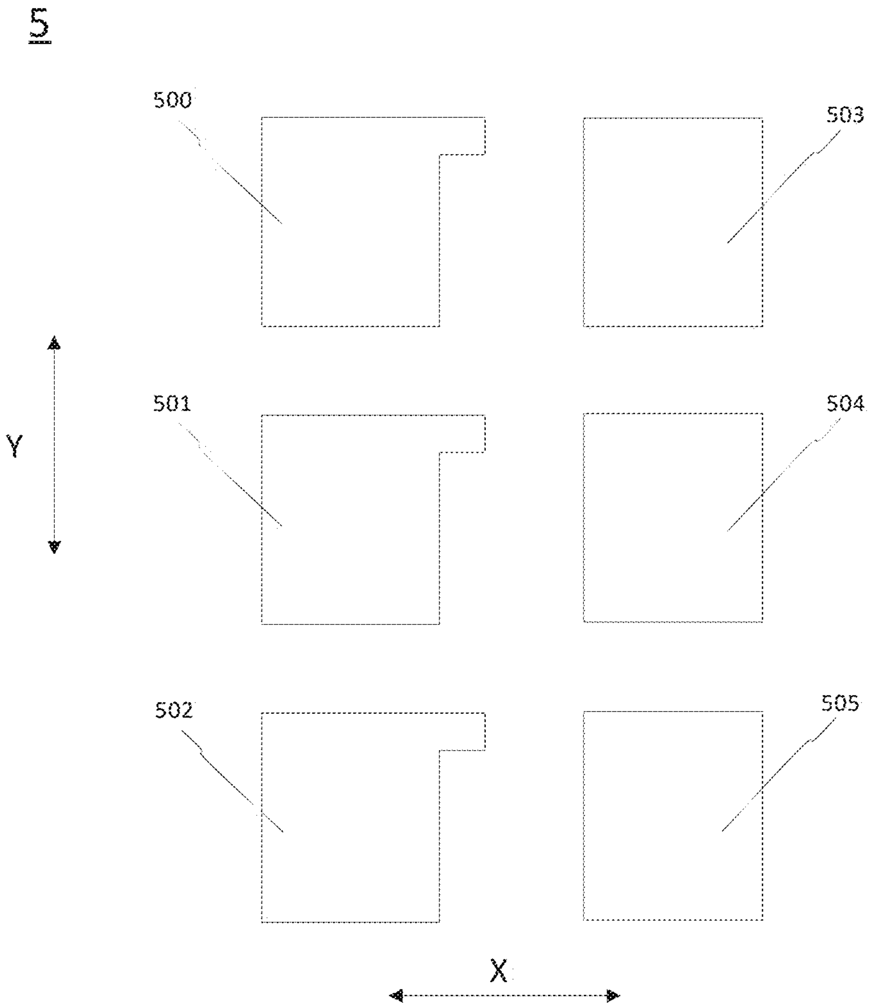
FIG. 16 is a structural layout of a fourth conductive layer in FIG. 11.

FIG. 11 is a structural layout according to an embodiment of the present disclosure, FIG. 12 is a structural layout of a first conductive layer in FIG. 11, FIG. 13 is a structural layout of an active layer in FIG. 11, FIG. 14 is a structural layout of a second conductive layer in FIG. 11, FIG. 15 is a structural layout of a third conductive layer in FIG. 11, and FIG. 16 is a structural layout of a fourth conductive layer in FIG. 11.

As shown in FIGS. 11 and 12, in the embodiment, the first conductive layer 1 may include a first conductive portion 101, a second conductive portion 102, a third conductive portion 103. The first conductive portion 101, the second conductive portion 102, and the third conductive portion 103 are used to form a first electrode of the first capacitor C1, a first electrode of the second capacitor C2, and a first electrode of the storage capacitor Cst, respectively. The first conductive layer 1 may also include a fourth conductive portion 104 and a fifth conductive portion 105. The fourth conductive portion 104 is used to form a bottom gate of the driver transistor M3. The fifth conductive portion 105 is connected to one end of the fourth conductive portion 104, and the fifth conductive portion 105 is also connected to a third transfer portion 403 of the third conductive layer 4 through a via hole to connect the gate of the driver transistor M3 to the first node N1 through the third transfer portion 403. In addition, the first conductive layer 1 may further include a sixth conductive portion 106 and a seventh conductive portion 107. The sixth conductive portion 106 and the seventh conductive portion 107 are connected to two sides of the third conductive portion 103 along the row direction X. The sixth conductive portion 106 may be connected to a seventh conductive portion 107 of an adjacent pixel unit. The seventh conductive portion 107 may be connected to a sixth conductive portion 106 of an adjacent pixel unit. Since the third conductive portion 103 is connected to the first power line VDD, the first power line VDD, the third conductive portion 103, the sixth conductive portion 106 and the seventh conductive portion 107 may form a grid structure, and the power line of the grid structure may reduce a voltage drop of the power signal thereon.

As shown in FIGS. 11 and 13, in the embodiment, the active layer 2 may include a first active portion 21 to a ninth active portion 29, a tenth active portion 230, an eleventh active portion 240, a twelfth active portion 250, a thirteenth active portion 260, and a fourteenth active portion 270, and a first sub-active portion 201 to a twenty-eighth sub-active portion 228. The first active portion 21 is used to form a channel region of the first transistor M1. The first sub-active portion 201 and the second sub-active portion 202 are connected to two ends of the first active portion 21 to form the first end and the second end of the first transistor M1, respectively. In addition, the second sub-active portion 202 is connected to the seventh active portion 27 to form the first end of the seventh transistor M7, and the second sub-active portion 202 may be connected to a second transfer portion 402 of the third conductive layer 4 through a via hole to connect the second end of the first transistor M1 and the first end of the seventh transistor M7 to the initial signal line Vinit through the second transfer portion 402. A second active portion 22 is used to form a channel region of the second transistor M2. A third sub-active portion 203 and a fourth sub-active portion 204 are connected to two sides of the second active portion 22 to form the first end and the second end of the second transistor M2, respectively. The third sub-active portion 203 may be connected to a third transfer portion 403 of the third conductive layer through a via hole to connect the first end of the second transistor M2 to the first node N1 through the third transfer portion 403. The fourth sub-active portion 204 may be connected to a fourth transfer portion 404 of the third conductive layer through a via hole to connect the second end of the second transistor M2 to the second end of the driver transistor M3 through the fourth transfer portion 404.

A third active portion 23 is used to form a channel region of the driver transistor M3. A fifth sub-active portion 205 and a sixth sub-active portion 206 are connected to two sides of the third active portion 23 to form a first end and a second end of the driver transistor M3, respectively. The fifth sub-active portion 205 may be connected to a fifth transfer portion 405 disposed in the third conductive layer 4 through a via hole to connect the first end of the driver transistor M3 to the third node N3. The sixth sub-active portion 206 may be connected to the fourth transfer portion 404 through a via hole to connect the second end of the drive transistor M3 to the second node N2, i.e., to the second end of the second transistor M2.

A fourth active portion 24 is used to form a channel region of the fourth transistor M4. A seventh sub-active portion 207 and an eighth sub-active portion 208 are connected to two sides of the fourth active portion 24 to form the first end and the second end of the fourth transistor M4, respectively. The seventh sub-active portion 207 may be connected to the data signal line Data through a via hole in order to connect the first end of the fourth transistor M4 to the data signal terminal Vdata. The eighth sub-active portion 208 may be connected to the fifth transfer portion 405 disposed in the third conductive layer 4 through a via hole in order to connect the second end of the fourth transistor M4 to the third node N3 through the fifth transfer portion 405.

A fifth active portion 25 is used to form a channel region of the fifth transistor M5. A ninth sub-active portion 209 and a tenth sub-active portion 210 are connected to two ends of the fifth active portion 25, respectively, to form the first end and the second end of the fifth transistor M5. The ninth sub-active portion 209 may be connected to a seventeenth conductive block 417 (specifically, it may be connected to a sub-conductive portion of the seventeenth conductive block 417) through a via hole in order to connect the first end of the fifth transistor M5 to the first power supply terminal VDD. The tenth sub-active portion 210 may be connected to the fifth transfer portion 405 through a via hole in order to connect the second end of the fifth transistor M5 to the third node N3.

A sixth active portion 26 is used to form a channel region of the sixth transistor M6. An eleventh sub-active portion 211 and a twelfth sub-active portion 212 are connected to two ends of the sixth active portion 26 to form the first end and the second end of the sixth transistor M6, respectively. The eleventh sub-active portion 211 may be connected to the fourth transfer portion 404 through a via hole in order to connect the first end of the sixth transistor M6 to the second node N2. The twelfth sub-active portion 212 may be connected to a sixth transfer portion 406 through a via hole in order to connect the second end of the sixth transistor M6 to the fourth node N4.

A seventh active portion 27 is used to form a channel region of the seventh transistor M7. The second sub-active portion 202 and a fourteenth sub-active portion 214 are connected to two sides of the seventh active portion 27 to form the first end and the second end of the seventh transistor M7. The second sub-active portion 202 may be connected to the second transfer portion 402 through a via hole in order to connect the first end of the seventh transistor M7 to the initial signal terminal Vinit through the second transfer portion 402. The fourteenth sub-active portion 214 may be connected to the sixth transfer portion 406 through a via hole in order to connect the second end of the seventh transistor M7 to the fourth node N4 through the sixth transfer portion 406.

An eighth active portion 28 is used to form a channel region of the eighth transistor M8. A fifteenth sub-active portion 215 and a sixteenth sub-active portion 216 are connected to two ends of the eighth active portion 28 to form the first end and the second end of the eighth transistor M8, respectively. The fifteenth sub-active portion 215 may be connected to the data signal line Data through a via hole in order to connect the first end of the eighth transistor M8 to the data signal terminal Vdata. The sixteenth sub-active portion 216 may be connected to a seventh transfer portion 407 through a via hole to connect the second end of the eighth transistor M8 to the first electrode of the first capacitor C1 through the seventh transfer portion 407.

A ninth active portion 29 is used to form a channel region of the ninth transistor M9. A seventeenth sub-active portion 217 and an eighteenth sub-active portion 218 are connected to two sides of the ninth active portion 29 to form the first end and the second end of the ninth transistor M9, respectively. The seventeenth sub-active portion 217 may be connected to a tenth conductive block 310 through a via hole (the tenth conductive block 310 is connected to an eighth transfer portion 408 through a via hole), in order to connect the first end of the ninth transistor M9 to the enable signal terminal EM through the tenth conductive block 310. The eighteenth sub-active portion 218 may be connected to a ninth transfer portion 409 through a via hole in order to connect the second end of the ninth transistor M9 to the gate of the sixth transistor M6 through the ninth transfer portion 409.

A tenth active portion 230 is used to form a channel region of the tenth transistor M10. A nineteenth sub-active portion 219 and a twentieth sub-active portion 220 are connected to two sides of the tenth active portion 230 in order to form the first end and the second end of the tenth transistor M10, respectively. The nineteenth sub-active portion 219 may be connected to the data signal line Data through a via hole in order to connect the first end of the tenth transistor M10 to the data signal terminal Vdata. The twentieth sub-active portion 220 may be connected to an eleventh transfer portion 411 through a via hole, the eleventh transfer portion 411 may be connected to a ninth conductive block 39 through a via hole, the ninth conductive block 39 is connected to a twelfth transfer portion 412 through a via hole, and the other end of the twelfth transfer portion 412 is connected to the second conductive block 32 (the second electrode of the second capacitor C2) through a via hole, so that the second end of the tenth transistor M10 is connected to the second electrode of the second capacitor C2.

An eleventh active portion 240 is used to form a channel region of the eleventh transistor M11. A twenty-first sub-active portion 221 and the twenty-second sub-active portion 222 are connected to two sides of the eleventh active portion 240 to form the first end and the second end of the tenth transistor M10, respectively. The twenty-first sub-active portion 221 may be connected to a sixteenth transfer portion 416 through a via hole, and the sixteenth transfer portion 416 is connected to a second high-frequency signal line HF2 through a seventh conductive block 37 so as to connect the first end of the eleventh transistor M11 to the high-frequency signal terminal HF. The twenty-second sub-active portion 222 may be connected to the ninth transfer portion 409 through a via hole so as to connect the second end of the eleventh transistor M11 to the gate of the sixth transistor M6 through the ninth transfer portion 409.

A twelfth active portion 250 is used to form a channel region of the twelfth transistor M12. A twenty-third sub-active portion 223 and a twenty-fourth sub-active portion 224 are connected to two sides of the twelfth active portion 250 to form the first end and the second end of the twelfth transistor M12, respectively. The twenty-third sub-active portion 223 may be connected to the sixth transfer portion 406 through a via hole to connect the first end of the twelfth transistor M12 to the fourth node N4 through the sixth transfer portion 406. The twenty-fourth sub-active portion 224 may be connected to a thirteenth transfer portion 413 through a via hole to connect the second end of the twelfth transistor M12 to the first electrode of the first sub-pixel through the thirteenth transfer portion 413.

A thirteenth active portion 260 is used to form a channel region of the thirteenth transistor M13. A twenty-fifth sub-active portion 225 and a twenty-sixth sub-active portion 226 are connected to two sides of the thirteenth active portion 260 to form the first end and the second end of the thirteenth transistor M13, respectively. The twenty-fifth sub-active portion 225 may be connected to the sixth transfer portion 406 through a via hole in order to connect the first end of the thirteenth transistor M13 to the fourth node N4 through the sixth transfer portion 406. The twenty-sixth sub-active portion 226 may be connected to a fourteenth transfer portion 414 through a via hole in order to connect the second end of the thirteenth transistor M13 to the first electrode of the second sub-pixel through the fourteenth transfer portion 414.

A fourteenth active portion 270 is used to form a channel region of the fourteenth transistor M14. A twenty-seventh sub-active portion 227 and a twenty-eighth sub-active portion 228 are connected to two sides of the fourteenth active portion 270 to form the first end and the second end of the fourteenth transistor M14, respectively. The twenty-seventh sub-active portion 227 may be connected to the sixth transfer portion 406 through a via hole in order to connect the first end of the fourteenth transistor M14 to the fourth node N4 through the sixth transfer portion 406. The twenty-eighth sub-active portion 228 may be connected to a fifteenth transfer portion 415 through a via hole in order to connect the second end of the fourteenth transistor M14 to the first electrode of the third sub-pixel through the fifteenth transfer portion 415.

The active layer 2 of the present disclosure may be formed from a polysilicon semiconductor material, and accordingly, the transistor in the display panel of the present disclosure may be a P-type low-temperature polysilicon thin-film transistor.

As shown in FIGS. 11 and 14, in the embodiment, the second conductive layer 3 may include a first conductive block 31, a second conductive block 32, and a third conductive block 33. An orthographic projection of the first conductive block 31 on the base substrate is disposed on an orthographic projection of the first conductive portion 101 on the base substrate. The first conductive block 31 is used to form a second electrode of the first capacitor C1. An orthographic projection of the second conductive block 32 on the base substrate is disposed on an orthographic projection of the second conductive portion 102 on the base substrate. The second conductive block 32 is used to form a second electrode of the second capacitor C2. The third conductive block 33 may include a first component 331, a second component 332 and a third component 333. An orthographic projection of the first component 331 on the base substrate is disposed on an orthographic projection of the third conductive portion 103 on the base substrate. The first component 331 of the third conductive block 33 is used to form a second electrode of the storage capacitor Cst. An orthographic projection of the second component 332 of the third conductive block 33 on the base substrate extends along the column direction Y. An orthographic projection of the third component 333 of the third conductive block 33 on the base substrate extends along the row direction X. The second component 332 of the third conductive block 33 is connected between the first component 331 and the third component 333. The orthographic projection of the third component 333 of the third conductive block 33 on the base substrate covers an orthographic projection of the third active portion 23 on the base substrate. A portion of the structure of the third component 333 of the third conductive block 33 is used to form the gate of the driver transistor M3.

As shown in FIGS. 11 and 14, in the embodiment, the second conductive layer 3 may further include a fourth conductive block 34 to a seventh conductive block 37. An orthographic projection of the fourth conductive block 34 on the base substrate covers an orthographic projection of the ninth active portion 29 on the base substrate. A portion of the structure of the fourth conductive block 34 is used to form the gate of the ninth transistor M9. The fourth conductive block 34 is connected to the seventh transfer portion 407 through a via hole in order to connect the gate of the ninth transistor M9 to the second electrode of the first capacitor C1 through the seventh transfer portion 407. An orthographic projection of the fifth conductive block 35 on the base substrate may extend in the row direction X. The fifth conductive block 35 is connected to the ninth transfer portion 409 and the tenth transfer portion 410 through via holes, respectively. The ninth transfer portion 409 is connected to the eighteenth sub-active portion 218 (the second end of the ninth transistor M9) and the twenty-second sub-active portion 222 (the second end of the eleventh transistor M11) through via holes. The tenth transfer portion 410 is connected to a sixth conductive block 36 (for forming the gate of the sixth transistor M6) through a via hole. In this way, the second end of the ninth transistor M9 and the second end of the eleventh transistor M11 are connected to the gate of the sixth transistor M6 through the ninth transfer portion 409 and the tenth transfer portion 410. The sixth conductive block 36 may include a first sub-conductive block 361 and a plurality of second sub-conductive blocks 362. An orthographic projection of the first sub-conductive block 361 on the base substrate may extend along the column direction Y. An orthographic projection of the second sub-conductive block 362 on the base substrate may extend along the row direction X. The plurality of second sub-conductive blocks 362 are provided in a one-to-one correspondence with the plurality of sixth active portions 26. An orthographic projection of the second sub-conductive block 362 on the base substrate covers an orthographic projection of the sixth active portion 26 on the base substrate. The second sub-conductive block 362 is used to form the gate of the sixth transistor M6. An orthographic projection of the seventh conductive block 37 on the base substrate may extend along the row direction X. The seventh conductive block 37 may be connected to a sixteenth transfer portion 416 and the second high-frequency signal line H1F2 through via holes, so as to connect the first end of the eleventh transistor M11 to the high-frequency signal terminal HF through the sixteenth transfer portion 416.

As shown in FIGS. 11 and 14, in the embodiment, the second conductive layer 3 may further include a first high-frequency signal line HF1, a third power line VSS2, a second power line VSS1, an initial signal line Vinit, a second reset signal line RSTB, a first reset signal line RSTA, a first power line VDD, an enable signal line EM, and a gate signal line Gate. Orthographic projections of the first high-frequency signal line HF1, the third power line VSS2, the second power line VSS1, the initial signal line Vinit, the second reset signal line RSTB, the first reset signal line RSTA, the first power line VDD, the enable signal line EM, and the gate signal line Gate on the base substrate all extend along the row direction X and are all distributed at intervals in the column direction Y. The first high-frequency signal line HF1, the third power line VSS2, and the second power line VSS1 are disposed on a side of the first conductive block 31 away from the third conductive block 33. The first high-frequency signal line HF1 is used to form the high-frequency signal terminal HF in FIG. 8. The first high-frequency signal line HF1 may be connected to the second high-frequency signal line HF2 of the third conductive layer 4 through a via hole. The third power line VSS2 is used to form the second power supply terminal of the second sub-pixel and the second power supply terminal of the third sub-pixel in FIG. 8. The second power line VSS1 is used to form the second power supply terminal of the first sub-pixel in FIG. 8.

As shown in FIG. 14, in the embodiment, the initial signal line Vinit, the second reset signal line RSTB, the first reset signal line RSTA, the first power line VDD, and the enable signal line EM are disposed between the first conductive block 31 and the third conductive block 33. The initial signal line Vinit is used to form the initial signal terminal Vinit in FIG. 8. The initial signal line Vinit is connected to the second transfer portion 402, the eighteenth conductive block 418, and the nineteenth conductive block 419 of the third conductive layer 4 through via holes, respectively. The second reset signal line RSTB is used to form the second reset signal terminal RSTB in FIG. 8. The orthographic projection of the second reset signal line RSTB on the base substrate partially covers the orthographic projection of the eighth active portion 28 on the base substrate. A portion of the structure of the second reset signal line RSTB is used to form the gate of the eighth transistor M8. The first reset signal line RSTA is used to form the first reset signal terminal RSTA in FIG. 8. An orthographic projection of the first reset signal line RSTA on the base substrate partially covers the orthographic projection of the first active portion 21 on the base substrate, partially covers the orthographic projection of the seventh active portion 27 on the base substrate, and partially covers the orthographic projection of the tenth active portion 230 on the base substrate. A portion of the structure of the first reset signal line RSTA is used to form the gate of the first transistor M1, a portion of the structure of the first reset signal line RSTA is used to form the gate of the seventh transistor M7, and a portion of the structure of the first reset signal line RSTA is used to form the gate of the tenth transistor M10. The first power line VDD is used to form the first power supply terminal VDD in FIG. 8. The first power line VDD is connected to the seventeenth conductive block 417 of the third conductive layer 4 through a via hole, so as to connect a first electrode of the storage capacitor Cst to the first power supply terminal VDD. The enable signal line EM is used to form the enable signal terminal EM in FIG. 8. The enable signal line EM includes a main body portion EM0, a first sub-extension portion EM1 and a plurality of second sub-extension portions EM2. Orthographic projections of the main body portion EM0 and the second sub-extension portions EM2 of the enable signal line EM on the base substrate extend in the row direction X. An orthographic projection of the first sub-extension portion EM1 of the enable signal line EM on the base substrate extends in the column direction Y. The plurality of second sub-extension portions EM2 are connected to the main body portion EM0 through the first sub-extension portion EM1. The plurality of second sub-extension portions EM2 are disposed in one-to-one correspondence with the plurality of fifth active portions 25, and the orthographic projections of the second sub-extension portions EM2 on the base substrate cover the orthographic projections of the fifth active portions 25 on the base substrate. The second sub-extension portion EM2 is used to form the gate of the fifth transistor M5. The gate signal line Gate is located on the side of a twentieth conductive block 500 away from the first conductive block 31. The gate signal line Gate is used to form the gate signal terminal Gate in FIG. 8. An orthographic projection of the gate signal line Gate on the base substrate partially covers the orthographic projection of the second active portion 22 on the base substrate, and partially covers the orthographic projection of the fourth active portion 24 on the base substrate. A portion of the structure of the gate signal line Gate is used to form the gate of the second transistor M2, and a portion of the structure of the gate signal line Gate is used to form the gate of the fourth transistor M4.

As shown in FIGS. 11 and 14, in the embodiment, the second conductive layer 3 may further include a ninth conductive block 39 and a tenth conductive block 310. An orthographic projection of the ninth conductive block 39 on the base substrate covers an orthographic projection of the eleventh active portion 240 on the base substrate. A portion of the structure of the ninth conductive block 39 is used to form the gate of the eleventh transistor M11. The ninth conductive block 39 is also connected to the eleventh transfer portion 411 and the twelfth transfer portion 412 (the twelfth transfer portion 412 is also connected to the second conductive block 32) through via holes, respectively, so as to connect the gate of the eleventh transistor M11, and the second end of the tenth transistor M10 to the second electrode of the second capacitor C2, respectively. The tenth conductive block 310 is connected to the seventeenth sub-active portion 217 and the eighth transfer portion 408 through via holes, respectively, so as to connect the first end of the ninth transistor M9 to the enable signal terminal EM.

As shown in FIGS. 11 and 14, in the embodiment, the second conductive layer 3 may further include a plurality of twelfth conductive blocks 312, a plurality of thirteenth conductive blocks 313, and a plurality of fourteenth conductive blocks 314. The plurality of twelfth conductive blocks 312 are disposed in one-to-one correspondence with the plurality of twelfth active portions 250. Orthographic projections of the twelfth conductive blocks 312 on the base substrate covers the orthographic projections of the twelfth active portions 250 on the base substrate. The twelfth active portion 250 is used to form the gate of the twelfth transistor M12. The plurality of thirteenth conductive blocks 313 are disposed in one-to-one correspondence with the plurality of thirteenth active portions 260. Orthographic projections of the thirteenth conductive blocks 313 on the base substrate cover the orthographic projections of the thirteenth active portions 260 on the base substrate. The thirteenth conductive block 313 is used to form the gate of the thirteenth transistor M13. The plurality of fourteenth conductive blocks 314 are disposed in one-to-one correspondence with the plurality of fourteenth active portions 270. Orthographic projections of the fourteenth conductive blocks 314 on the base substrate cover the orthographic projections of the fourteenth active portions 270 on the base substrate. The fourteenth conductive block 314 is used to form the gate of the fourteenth transistor M14.

In the display panel of the present disclosure, the second conductive layer 3 may be used as a mask to perform conductorization processing on the active layer 2, i.e., the active layer 2 covered by the second conductive layer 3 forms a channel region of the transistor, and the region of the active layer 2 not covered by the second conductive layer 3 forms a conductor structure.

It will be understood that an orthographic projection of a certain structure A on the base substrate covering an orthographic projection of another structure B on the base substrate described in the present disclosure, may be understood to be that an outline of the projection of structure B in the plane of the base substrate lies entirely within an outline of the projection of structure A in the same plane.

In addition, a certain structure A extending along a direction B described in the present disclosure means that the structure A may include a major portion and a minor portion connected to the major portion, the major portion being a line, line segment, or bar-shaped body, the major portion extending along the direction B, and the length of the major portion extending along direction B is greater than the length of the minor portion extending along the other direction.

As shown in FIGS. 11 and 15, in the embodiment, the third conductive layer 4 may include a first transfer portion 401 to a sixteenth transfer portion 416. One end of the first transfer portion 401 is connected to the first sub-active portion 201 through a via hole in order to be connected to the first end of the first transistor M1. The other end of the first transfer portion 401 is connected to the third conductive block 33 of the second conductive layer 3 through a via hole in order to connect the first end of the first transistor M1 to the second electrode of the storage capacitor Cst through the first transfer portion 401. One end of the second transfer portion 402 is connected to the second sub-active portion 202 through a via hole to be connected to the second end of the first transistor M1 and the first end of the seventh transistor M7. The other end of the second transfer portion 402 is connected to the initial signal line Vinit of the second conductive layer 3 through a via hole in order to connect the second end of the first transistor M1 and the first end of the seventh transistor M7 to the initial signal terminal Vinit through the second transfer portion 402. One end of the third transfer portion 403 is connected to the third sub-active portion 203 through a via hole to be connected to the first end of the second transistor M2. The other end of the third transfer portion 403 is connected to the third conductive block 33 (specifically, it may be connected to the third component 333 of the third conductive block 33) through a via hole in order to connect, through the third transfer portion 403, the first end of the second transistor M2 to the second electrode of the storage capacitor Cst, i.e., the first node N1 in FIG. 8. The fourth transfer portion 404 is connected to the fourth sub-active portion 204, the sixth sub-active portion 206, and the eleventh sub-active portion 211 through via holes, respectively, in order to be connected to the second end of the second transistor M2, the second end of the driver transistor M3, and the first end of the sixth transistor M6, respectively.

As shown in FIG. 15, in the embodiment, the fifth transfer portion 405 may be connected to the fifth sub-active portion 205 and the eighth sub-active portion 208 through via holes, respectively, in order to be connected to the first end of the driver transistor M3 and the second end of the fourth transistor M4, respectively. The fifth transfer portion 405 is also connected to the tenth sub-active portion 210 through a via hole in order to connect the first end of the driver transistor M3, the second end of the fourth transistor M4, and the second end of the fifth transistor M5 to the third node N3. The sixth transfer portion 406 may be used to form the fourth node N4 in FIG. 8. An orthographic projection of a portion of the structure of the sixth transfer portion 406 on the base substrate covers the orthographic projection of the twelfth sub-active portion 212 on the base substrate, an orthographic projection of a portion of the structure of the sixth transfer portion 406 on the base substrate covers the orthographic projection of the twenty-third sub-active portion 223 on the base substrate, an orthographic projection of a portion of the structure of the sixth transfer portion 406 on the base substrate covers the orthographic projection of the twenty-fifth sub-active portion 225 on the base substrate, and an orthographic projection of a portion of the structure of the sixth transfer portion 406 on the base substrate covers the orthographic projection of the twenty-seventh sub-active portion 227 on the base substrate. The sixth transfer portion 406 may be connected to the twelfth sub-active portion 212, the twenty-third sub-active portion 223, the twenty-fifth sub-active portion 225, and the twenty-seventh sub-active portion 227 through via holes, respectively, in order to be connected to the second end of the sixth transistor M6, the first end of the twelfth transistor M12, the first end of the thirteenth transistor M13, and the first end of the fourteenth transistor, respectively. The seventh transfer portion 407 may be connected to the first conductive block 31, the sixteenth sub-active portion 216, and the fourth conductive block 34 through via holes, respectively, in order to connect the second end of the eighth transistor M8, and the gate of the ninth transistor M9 to the second electrode of the first capacitor C1, respectively. The eighth transfer portion 408 is connected to the seventeenth sub-active portion 217 and the enable signal line EM through via holes, respectively, in order to connect the first end of the ninth transistor M9 to the enable signal terminal EM through the eighth transfer portion 408.

As shown in FIG. 15, in the embodiment, one end of the ninth transfer portion 409 is connected to the fifth conductive block 35 through a via hole, and the other end of the ninth transfer portion 409 is connected to the eighteenth sub-active portion 218 and the twenty-second sub-active portion 222 through via holes, respectively, in order to connect the second end of the ninth transistor M9 and the second end of the eleventh transistor M11 to the gate of the sixth transistor M6. The tenth transfer portion 410 may be connected to the sixth conductive block 36 (for forming the gate of the sixth transistor M6) and the fifth conductive block 35 through via holes. The eleventh transfer portion 411 may be connected to the twentieth sub-active portion 220 and the ninth conductive block 39 through via holes, respectively, and the twelfth transfer portion 412 may be connected to the ninth conductive block 39 and the second conductive block 32 through via holes, respectively, so that the second end of the tenth transistor M10, and the gate of the eleventh transistor M11 are connected to the second electrode of the second capacitor C2.

As shown in FIG. 15, in the embodiment, the thirteenth transfer portion 413 is connected to the twenty-fourth sub-active portion 224 and the first electrode P-AOD of the first sub-pixel through via holes, in order to connect the second end of the twelfth transistor M12 to the first electrode P-AOD of the first sub-pixel. The fourteenth transfer portion 414 is connected to the twenty-sixth sub-active portion 226 through a via hole, in order to connect the second end of the thirteenth transistor M13 to the first electrode P-AOD of the second sub-pixel. The fifteenth transfer portion 415 may be connected to the twenty-eighth sub-active portion 228 through a via hole in order to connect the second end of the fourteenth transistor M14 to the first electrode P-AOD of the third sub-pixel.

As shown in FIG. 15, in the embodiment, the sixteenth transfer portion 416 is connected to the twenty-first sub-active portion 221 and the seventh conductive block 37 (the seventh conductive block 37 is connected to the second high-frequency signal line H1F2) through via holes, respectively, in order to connect the first end of the eleventh transistor M11 to the high-frequency signal terminal HF.

As shown in FIGS. 11 and 15, in the embodiment, the third conductive layer 4 may also include a seventeenth conductive block 417 to a nineteenth conductive block 419. The seventeenth conductive block 417 may include a main conductive portion 4171 and a sub-conductive portion 4172. An orthographic projection of the main conductive portion 4171 on the base substrate is located on the orthographic projection of the third conductive portion 103 on the base substrate, and the main conductive portion 4171 may be connected to the third conductive portion 103 through a via hole. The seventeenth conductive block 417 and the third conductive portion 103 are each used to form the first electrode of the storage capacitor Cst. The sub-conductive portion 4172 of the seventeenth conductive block 417 is connected to the ninth sub-active portion 209 through a via hole to be connected to the first end of the fifth transistor M5. An orthographic projection of the eighteenth conductive block 418 on the base substrate is located on the orthographic projection of the first conductive portion 101 on the base substrate. The eighteenth conductive block 418 is connected to the first conductive portion 101 through a via hole, and the eighteenth conductive block 418 and the first conductive portion 101 are used to form the first electrode of the first capacitor C1. An orthographic projection of the nineteenth conductive block 419 on the base substrate is located on the orthographic projection of the second conductive portion 102 on the base substrate. The nineteenth conductive block 419 is connected to the second conductive portion 102 through a via hole, and the nineteenth conductive block 419 and the second conductive portion 102 are used to form the first electrode of the second capacitor C2. It will be understood that by providing the seventeenth conductive block 417 in the third conductive layer 4 to connect the third conductive portion 103 of the first conductive layer 1 to form a parallel structure with the first conductive portion 101, the resistance value of the first electrode of the formed storage capacitor Cst can thereby be reduced, which contributes to the reduction of the voltage drop loss on the storage capacitor Cst. Similarly, by providing the eighteenth conductive block 418 in the third conductive layer 4 to form a parallel structure with the first conductive portion 101, the voltage drop loss on the first electrode of the first capacitor C1 can be reduced, and by providing the nineteenth conductive block 419 to form a parallel structure with the second conductive portion 102, the voltage drop loss on the first electrode of the second capacitor C2 can be reduced.

As shown in FIG. 15, in the embodiment, the third conductive layer 4 may further include a data signal line Data. The data signal line Data may be used to form the data signal terminal Vdata in FIG. 8. An orthographic projection of the data signal line Data on the base substrate extends in the column direction Y. The data signal line Data may be connected to the seventh sub-active portion 207, the fifteenth sub-active portion 215, and the nineteenth sub-active portion 219 through via holes, respectively, in order to connect the first end of the fourth transistor M4, the first end of the eighth transistor M8, and the first end of the tenth transistor M10, respectively, to the data signal terminal Vdata.

As shown in FIGS. 11 and 16, in the embodiment, the fourth conductive layer 5 may include a twentieth conductive block 500 to a twenty-fifth conductive block 505. The twentieth conductive block 500 is used to form the first electrode P-AOD of the first sub-pixel. The twentieth conductive block 500 may be connected to the thirteenth transfer portion 413 through a via hole to connect the first electrode P-AOD of the first sub-pixel to the second end of the twelfth transistor M12 through the thirteenth transfer portion 413. A twenty-first conductive block 501 is used to form the first electrode P-AOD of the second sub-pixel. The twenty-first conductive block 501 may be connected to the fourteenth transfer portion 414 through a via hole in order to connect the first electrode P-AOD of the second sub-pixel to the second end of the thirteenth transistor M13 through the fourteenth transfer portion 414. A twenty-second conductive block 502 is used to form the first electrode P-AOD of the third sub-pixel. The twenty-second conductive block 502 may be connected to the fifteenth transfer portion 415 through a via hole in order to connect the first electrode P-AOD of the third sub-pixel to the second end of the fourteenth transistor M14 through the fifteenth transfer portion 415.

A twenty-third conductive block 503 is used to form the second electrode P-CTO of the first sub-pixel. The twenty-third conductive block 503 may be connected to the second power line VSS1 of the second conductive layer 3 through a via hole, in order to connect the second electrode P-CTO of the first sub-pixel to the corresponding second power supply terminal. A twenty-fourth conductive block 504 is used to form the second electrode P-CTO of the second sub-pixel, and a twenty-fifth conductive block 505 is used to form the second electrode P-CTO of the third sub-pixel. The twenty-fourth conductive block 504 and the twenty-fifth conductive block 505 may be connected to the third power line VSS2 of the second conductive layer 3 through via holes, respectively, in order to connect the second electrode P-CTO of the second sub-pixel and the second electrode P-CTO of the third sub-pixel to the corresponding second power supply terminal.

As shown in FIG. 11, in the embodiment, in the pixel unit, the orthographic projection of the layout structure for forming the pixel driver circuit P-Drive on the base substrate is located on a side of the orthographic projection of the first electrode P-AOD of the sub-pixel on the base substrate away from the orthographic projection of the second electrode P-CTO on the base substrate, and the orthographic projection of the layout structure for forming the switching circuit MSW on the base substrate is located between the orthographic projection of the first electrode P-AOD of the sub-pixel on the base substrate and the orthographic projection of the second electrode P-CTO of the sub-pixel on the base substrate. Of course, in other embodiments, the pixel driver circuit P-Drive, the switching circuit MSW, and the first electrode and the second electrode of the sub-pixel in the pixel unit may have other layout structures. For example, the layout structure for forming the switching circuit MSW may be disposed below the first electrode and the second electrode of the sub-pixel, i.e., the orthographic projection of the layout structure for forming the switching circuit MSW on the base substrate is overlapped with the orthographic projections of the first electrode and the second electrode of the sub-pixel on the base substrate, all of which fall within the scope of protection of the present disclosure and will not be described in detail herein.

Figure 17:
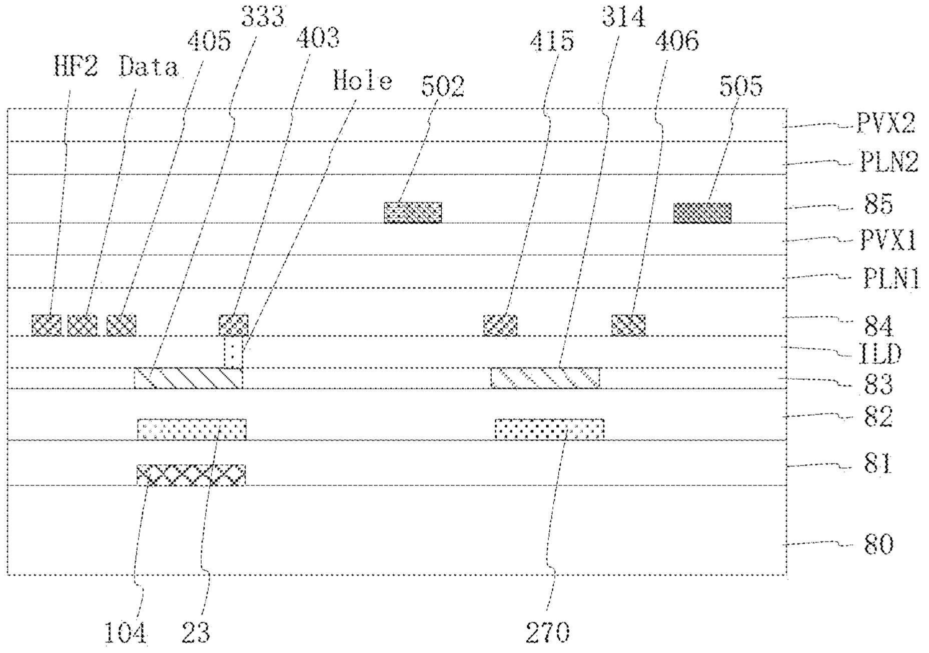
FIG. 17 is a partial cross-sectional view along a dashed line AA in FIG. 11.

FIG. 17 is a partial cross-sectional view along a dashed line AA in FIG. 11. As shown in FIG. 17, the display panel may include a first insulating layer 81, a second insulating layer 82, a third insulating layer 83, an interlayer dielectric layer ILD, a fourth insulating layer 84, a first flat layer PLN1, a first passivation layer PVX1, a second flat layer PLN2, and a second passivation layer PVX2, where the base substrate 80, the first insulating layer 81, the first conductive layer 1, the second insulating layer 82, the active layer 2, the third insulating layer 83, the second conductive layer 3, the interlayer dielectric layer ILD, the fourth insulating layer 84, the third conductive layer 4, the first flat layer PLN1, the first passivation layer PVX1, the fourth conductive layer 5, the second flat layer PLN2, and the second passivation layer PVX2 are stacked in sequence. The first insulating layer 81 and the second insulating layer 82 may be silicon oxide layers, and the first dielectric layer 86 may be a silicon nitride layer. The base substrate may include a glass substrate, a barrier layer, and a polyimide layer stacked in sequence, where the barrier layer may be an inorganic material. The material of the first conductive layer 1 and the second conductive layer 3 may be one of molybdenum, aluminum, copper, titanium, niobium, or may be an alloy, or a molybdenum alloy, a titanium alloy, or a stack of molybdenum and titanium. The material of the third conductive layer 4 and the fourth conductive layer 5 may include a metallic material, for example it may be one of molybdenum, aluminum, copper, titanium, or niobium, or may be an alloy, or a molybdenum alloy, a titanium alloy, or a stack of molybdenum and titanium, etc., or it may be a stack of titanium, aluminum, and titanium.

The present disclosure further provides a display device including a display panel described in any of the embodiments of the present disclosure.

Those skilled in the art, after considering the specification and practicing the invention disclosed herein, will readily conceive of other embodiments of the present disclosure. This application is intended to cover any variations, uses, or adaptations of the present disclosure that follow the general principles of the present disclosure and that include common knowledge or customary technical means in the technical field that are not disclosed herein. The specification and embodiments are to be considered exemplary only, and the true scope and spirit of the disclosure is indicated by the appended claims.

What is claimed is:

1. A display panel, comprising:

a plurality of pixel units distributed in an array along a row direction and a column direction, and a first driving circuit in a display area of the display panel, the first driving circuit being configured to output a gate control signal;

wherein the pixel unit comprises:

a pixel driver circuit configured to provide a driving current;

a plurality of sub-pixels, wherein a first electrode of the sub-pixel is configured to be connected to the pixel driver circuit, a second electrode of the sub-pixel is connected to a second power supply terminal, and the sub-pixel is configured to emit light under an action of the driving current; and a switching circuit comprising a plurality of switching units arranged in correspondence with the plurality of sub-pixels, wherein the switching unit is connected in series between the pixel driver circuit and a corresponding sub-pixel, a control end of the switching unit is configured to receive a switching signal, a first end of the switching unit is connected to the pixel driver circuit, a second end of the switching unit is connected to a first electrode of the corresponding sub-pixel, and the switching unit is configured to conduct a communication path between the corresponding sub-pixel and the pixel driver circuit in response to the switching signal;

wherein the pixel driver circuit is configured to transmit a data signal from a data signal terminal to a driving signal terminal in response to the gate control signal, the first driving circuit comprises a plurality of cascaded first shift register units, and the first shift register unit that provides the gate control signal to a $n^{th}$ row of pixel units is between the $n^{th}$ row of pixel units and a $(n+1)^{th}$ row of pixel units, n being a positive integer greater than 0.

2. The display panel of claim 1, comprising a base substrate;

wherein in a same pixel unit, an orthographic projection of the pixel driver circuit on the base substrate is on a side, away from an orthographic projection of the second electrode of the sub-pixel on the base substrate, of an orthographic projection of the first electrode of the sub-pixel on the base substrate, and an orthographic projection of the switching unit on the base substrate is between an orthographic projection of the first electrode of the corresponding sub-pixel on the base substrate and an orthographic projection of the second electrode of the corresponding sub-pixel on the base substrate.

3. The display panel of claim 1, further comprising:

a switch driving circuit in the display area of the display panel, wherein the switch driving circuit is configured to output the switching signal.

4. The display panel of claim 3, wherein the switch driving circuit comprises a plurality of sub-switch driving circuits, one sub-switch driving circuit being configured to drive a column of switching units; and wherein the sub-switch driving circuit comprises a plurality of cascaded third shift register units, and the third shift register unit that provides the switching signal to a $n^{th}$ row of switching circuits is in a gap between the $n^{th}$ row of pixel units and a (n+1) th row of pixel units, n being a positive integer greater than 0.

5. The display panel of claim 3, wherein the pixel unit comprises a first sub-pixel, a second sub-pixel and a third sub-pixel;

wherein the switching circuit comprises a first switching unit, a second switching unit and a third switching unit, wherein the first switching unit is correspondingly connected to the first sub-pixel, the second switching unit is correspondingly connected to the second sub-pixel, and the third switching unit is correspondingly connected to the third sub-pixel;

wherein the switch driving circuit comprises a first sub-switch driving circuit, a second sub-switch driving circuit and a third sub-switch driving circuit, wherein the first sub-switch driving circuit is configured to output a first switching signal to the first switching unit, the second sub-switch driving circuit is configured to output a second switching signal to the second switching unit, and the third sub-switch driving circuit is configured to output a third switching signal to the third switching unit;

wherein the first sub-switch driving circuit, the second sub-switch driving circuit and the third sub-switch driving circuit are configured to successively output the first switching signal, the second switching signal and the third switching signal row by row; and the first driving circuit is configured to output gate control signals respectively during a time when the first sub-switch driving circuit outputs the first switching signal, during a time when the second sub-switch driving circuit outputs the second switching signal, and during a time when the third sub-switch driving circuit outputs the third switching signal.

6. The display panel of claim 3, comprising two switch driving circuits disposed separately along the row direction on two sides of the display area.

7. The display panel of claim 1, wherein the pixel driver circuit comprises:

a driver device connected to a first node, a second node and a third node, wherein the driver device is configured to provide, in response to a voltage signal from the first node, the driving current using a voltage difference between the second node and the third node;

a first reset device connected to the first node, a first reset signal terminal and an initial signal terminal, wherein the first reset device is configured to transmit an initial signal from the initial signal terminal to the first node in response to a reset signal from the first reset signal terminal;

a transmission device connected to the first node, a gate signal terminal and the second node, wherein the transmission device is configured to conduct a communication path between the first node and the second node in response to a signal from the gate signal terminal;

a data writing device connected to a data signal terminal, the gate signal terminal and the third node, wherein the data writing device is configured to transmit a second data signal from the data signal terminal to the third node in response to the signal from the gate signal terminal;

a second reset device connected to a fourth node, the initial signal terminal and the first reset signal terminal, wherein the second reset device is configured to transmit the initial signal from the initial signal terminal to the fourth node in response to the reset signal from the first reset signal terminal;

a first light-emitting control device connected to the third node, an enable signal terminal and a first power supply terminal, wherein the first light-emitting control device is configured to conduct a communication path between the third node and the first power supply terminal in response to an enable signal from the enable signal terminal;

a second light-emitting control device connected to the second node, the fourth node and an adjustment device, wherein the second light-emitting control device is configured to conduct a communication path between the fourth node and the second node in response to a signal from the adjustment device;

a storage device connected to the first node and the first power supply terminal, wherein the storage device is configured to store the voltage signal written to the first node; and the adjustment device connected to the data signal terminal, a second reset signal terminal, the first reset signal terminal, the initial signal terminal and the enable signal terminal, wherein the adjustment device is configured to turn off the second light-emitting control device in response to a first data signal from the data signal terminal, or to turn on the second light-emitting control device in response to a second data signal from the data signal terminal.

8. The display panel of claim 7, wherein the driver device comprises:

a driver transistor with a control end connected to the first node, a first end connected to the third node, and a second end connected to the second node;

the first reset device comprises:

a first transistor with a control end connected to the first reset signal terminal, a first end connected to the first node, and a second end connected to the initial signal terminal;

the transmission device comprises:

a second transistor with a control end connected to the gate signal terminal, a first end connected to the first node, and a second end connected to the second node;

the data writing device comprises:

a fourth transistor with a control end connected to the gate signal terminal, a first end connected to the data signal terminal, and a second end connected to the third node;

the second reset device comprises:

a seventh transistor with a control end connected to the first reset signal terminal, a first end connected to the initial signal terminal, and a second end connected to the fourth node;

the first light-emitting control device comprises:

a fifth transistor with a control end connected to the enable signal terminal, a first end connected to the first power supply terminal, and a second end connected to the third node;

the second light-emitting control device comprises:

a sixth transistor with a control end connected to a seventh node, a first end connected to the second node, and a second end connected to the fourth node;

the storage device comprises:

a storage capacitor with a first electrode connected to the first power supply terminal, and a second electrode connected to the first node; and the adjustment device comprises:

an eighth transistor with a control end connected to the second reset signal terminal, a first end connected to the data signal terminal, and a second end connected to a fifth node, wherein the eighth transistor is configured to transmit the data signal from the data signal terminal to the fifth node in response to a reset signal from the second reset signal terminal;

a ninth transistor with a control end connected to the fifth node, a first end connected to the enable signal terminal, and a second end connected to the seventh node, wherein the ninth transistor is configured to transmit the enable signal from the enable signal terminal to the seventh node in response to a voltage signal from the fifth node;

a first capacitor connected to the fifth node and the initial signal terminal, wherein the first capacitor is configured to store the voltage signal written to the fifth node;

a tenth transistor with a control end connected to the first reset signal terminal, a first end connected to the data signal terminal, and a second end connected to a sixth node, wherein the tenth transistor is configured to transmit the data signal from the data signal terminal to the sixth node in response to the reset signal from the first reset signal terminal;

an eleventh transistor with a control end connected to the sixth node, a first end connected to a high-frequency signal terminal, and a second end connected to the seventh node, wherein the eleventh transistor is configured to transmit a signal from the high-frequency signal terminal to the seventh node in response to a voltage signal from the sixth node; and a second capacitor connected to the sixth node and the initial signal terminal, wherein the second capacitor is configured to store the voltage signal written to the sixth node.

9. The display panel of claim 8, wherein the pixel unit comprises a first sub-pixel, a second sub-pixel, and a third sub-pixel, and the switching circuit comprises a twelfth transistor, a thirteenth transistor, and a fourteenth transistor; and wherein a control end of the twelfth transistor is configured to receive a first switching signal, a first end of the twelfth transistor is connected to the fourth node, and a second end of the twelfth transistor is connected to a first electrode of the first sub-pixel;

a control end of the thirteenth transistor is configured to receive a second switching signal, a first end of the thirteenth transistor is connected to the fourth node, and a second end of the thirteenth transistor is connected to a first electrode of the second sub-pixel; and a control end of the fourteenth transistor is configured to receive a third switching signal, a first end of the fourteenth transistor is connected to the fourth node, and a second end of the fourteenth transistor is connected to a first electrode of the third sub-pixel.

10. The display panel of claim 9, comprising:

a base substrate;

a first conductive layer on a side of the base substrate, the first conductive layer comprising:

a third conductive portion configured to form a first electrode of the storage capacitor;

an active layer on a side of the first conductive layer away from the base substrate, the active layer comprising:

a first active portion, wherein an orthographic projection of the first active portion on the base substrate is between an orthographic projection of a first conductive portion on the base substrate and an orthographic projection of the third conductive portion on the base substrate, and the first active portion is configured to form a channel region of the first transistor;

a first sub-active portion connected to a side of the first active portion and configured to form the first end of the first transistor;

a second sub-active portion connected to an other side of the first active portion and configured to form the second end of the first transistor and the first end of the seventh transistor;

a seventh active portion, wherein a side of the seventh active portion is connected to the second sub-active portion, and the seventh active portion is configured to form a channel region of the seventh transistor;

a fourteenth sub-active portion connected to an other side of the seventh active portion and configured to form the second end of the seventh transistor;

a third active portion, wherein an orthographic projection of the third active portion on the base substrate is on a side of the orthographic projection of the third conductive portion on the base substrate along the column direction, and the third active portion is configured to form a channel region of the driver transistor;

a fifth sub-active portion connected to a side of the third active portion in the column direction and configured to form the first end of the driver transistor;

a sixth sub-active portion connected to an other side of the third active portion and configured to form the second end of the driver transistor;

a second active portion on a side of the third active portion along the row direction, the second active portion being configured to form a channel region of the second transistor;

a third sub-active portion connected to a side of the second active portion close to the third active portion along the row direction, the third sub-active portion being configured to form the first end of the second transistor;

a fourth sub-active portion connected to a side of the second active portion away from the third active portion, the fourth sub-active portion being configured to form the second end of the second transistor;

a fourth active portion on a side of the third active portion away from the second active portion, the fourth active portion being configured to form a channel region of the fourth transistor;

a seventh sub-active portion connected to a side of the fourth active portion away from the third active portion, the seventh sub-active portion being configured to form the first end of the fourth transistor;

an eighth sub-active portion connected to a side of the fourth active portion close to the third active portion, the eighth sub-active portion being configured to form the second end of the fourth transistor;

a fifth active portion, wherein an orthographic projection of the fifth active portion on the base substrate is between the orthographic projection of the third active portion on the base substrate and the orthographic projection of the third conductive portion on the base substrate, and the fifth active portion is configured to form a channel region of the fifth transistor;

a ninth sub-active portion connected to a side of the fifth active portion away from the third active portion, the ninth sub-active portion being configured to form the first end of the fifth transistor;

a tenth sub-active portion connected to a side of the fifth active portion close to the third active portion, the tenth sub-active portion being configured to form the second end of the fifth transistor;

a sixth active portion on a side of the fifth active portion along the row direction, the sixth active portion being configured to form a channel region of the sixth transistor;

an eleventh sub-active portion connected to a side of the sixth active portion close to the third active portion, the eleventh sub-active portion being configured to form the first end of the sixth transistor;

a twelfth sub-active portion connected to an other side of the sixth active portion, the twelfth sub-active portion being configured to form the second end of the sixth transistor;

a second conductive layer on a side of the active layer away from the base substrate, the second conductive layer comprising:

a third conductive block comprising a first component, a second component and a third component connected in sequence, wherein an orthographic projection of the first component on the base substrate partially overlaps with the orthographic projection of the third conductive portion on the base substrate, an orthographic projection of the third component on the base substrate covers the orthographic projection of the third active portion on the base substrate, and a portion of the third conductive portion is configured to form the second electrode of the storage capacitor and a portion of the third conductive portion is configured to form a top gate of the driver transistor;

a gate signal line, wherein an orthographic projection of the gate signal line on the base substrate extends in the row direction, the orthographic projection of the gate signal line on the base substrate is on a side of the orthographic projection of the third component on the base substrate away from the orthographic projection of the first component on the base substrate, the orthographic projection of the gate signal line on the base substrate partially covers an orthographic projection of the second active portion on the base substrate, and partially covers an orthographic projection of the fourth active portion on the base substrate, and a portion of the gate signal line is configured to form a gate of the second transistor and a portion of the gate signal line is configured to form a gate of the fourth transistor;

an enable signal line comprising a main body portion, a first sub-extension portion and a second sub-extension portion connected in sequence, wherein an orthographic projection of the main body portion on the base substrate is on a side of an orthographic projection of the third conductive block on the base substrate away from the orthographic projection of the gate signal line on the base substrate, an orthographic projection of the second sub-extension portion on the base substrate covers the orthographic projection of the fifth active portion on the base substrate, and a portion of the enable signal line is configured to form a gate of the fifth transistor;

a sixth conductive block comprising a first sub-conductive block and a second sub-conductive block, wherein an orthographic projection of the first sub-conductive block on the base substrate extends in the column direction, an orthographic projection of the second sub-conductive block on the base substrate covers an orthographic projection of the sixth active portion on the base substrate, and a portion of the sixth conductive block is configured to form a gate of the sixth transistor; and a first reset signal line, wherein an orthographic projection of the first reset signal line on the base substrate extends in the row direction and is on a side of the orthographic projection of the third conductive block on the base substrate away from the orthographic projection of the third active portion on the base substrate, and the orthographic projection of the first reset signal line on the base substrate covers the orthographic projection of the first active portion on the base substrate and an orthographic projection of the seventh active portion on the base substrate, and a portion of the first reset signal line is configured to form a gate of the first transistor and a gate of the seventh transistor; and a third conductive layer on a side of the second conductive layer away from the base substrate, the third conductive layer comprising:

a third transfer portion, wherein an end of the third transfer portion is connected to the third sub-active portion through a via hole, and an other end of the third transfer portion is connected to the third conductive block through a via hole;

a fourth transfer portion connected to the fourth sub-active portion, the sixth sub-active portion, and the eleventh sub-active portion through via holes, respectively;

a fifth transfer portion connected to the fifth sub-active portion, the eighth sub-active portion, and the tenth sub-active portion through via holes, respectively;

a sixth transfer portion connected to the twelfth sub-active portion through a via hole;

a seventeenth conductive block comprising a main conductive portion and a sub-conductive portion, wherein an orthographic projection of the main conductive portion on the base substrate is on the orthographic projection of the third conductive block on the base substrate, and wherein the seventeenth conductive block is connected to the third conductive portion and to the ninth sub-active portion through via holes, respectively, and a portion of the seventeenth conductive block is configured to form the first electrode of the storage capacitor and a portion of the seventeenth conductive block is configured to form the first end of the fifth transistor; and a data signal line, wherein an orthographic projection of the data signal line on the base substrate extends in the column direction, and the data line is connected to the seventh sub-active portion through a via hole.

11. The display panel of claim 10, wherein the first conductive layer further comprises:

a first conductive portion configured to form a first electrode of the first capacitor;

a second conductive portion configured to form a second electrode of the second capacitor;

a fourth conductive portion on a side of the third conductive portion away from the first conductive portion, wherein an orthographic projection of the fourth conductive portion on the base substrate covers the orthographic projection of the third active portion on the base substrate, and the fourth conductive portion is configured to form a bottom gate of the driver transistor; and a fifth conductive portion connected to a side of the fourth conductive portion, wherein the fifth conductive portion is connected to the third transfer portion through a via hole;

the active layer further comprises:

an eighth active portion, wherein an orthographic projection of the eighth active portion on the base substrate is between an orthographic projection of the first conductive portion on the base substrate and the orthographic projection of the third conductive portion on the base substrate, and the eighth active portion is configured to form a channel region of the eighth transistor;

a fifteenth sub-active portion connected to a side of the eighth active portion and configured to form the first end of the eighth transistor;

a sixteenth sub-active portion connected to an other side of the eighth active portion and configured to form the second end of the eighth transistor;

a ninth active portion, wherein an orthographic projection of the ninth active portion on the base substrate is between the orthographic projection of the first conductive portion on the base substrate and the orthographic projection of the third conductive portion on the base substrate, and the ninth active portion is configured to form a channel region of the ninth transistor;

a seventeenth sub-active portion connected to a side of the ninth active portion and configured to form the first end of the ninth transistor;

an eighteenth sub-active portion connected to an other side of the ninth active portion and configured to form the second end of the ninth transistor;

a tenth active portion, wherein an orthographic projection of the tenth active portion on the base substrate is between the orthographic projection of the first conductive portion on the base substrate and the orthographic projection of the third conductive portion on the base substrate, and the tenth active portion is configured to form a channel region of the tenth transistor;

a nineteenth sub-active portion connected to a side of the tenth active portion and configured to form the first end of the tenth transistor;

a twentieth sub-active portion connected to an other side of the tenth active portion and configured to form the second end of the tenth transistor;

an eleventh active portion, wherein an orthographic projection of the eleventh active portion on the base substrate is between the orthographic projection of the first conductive portion on the base substrate and the orthographic projection of the third conductive portion on the base substrate, and the eleventh active portion is configured to form a channel region of the eleventh transistor;

a twenty-first sub-active portion connected to a side of the eleventh active portion and configured to form the first end of the eleventh transistor; and a twenty-second sub-active portion connected to an other side of the eleventh active portion and configured to form the second end of the eleventh transistor;

the second conductive layer further comprises:

a first high-frequency signal line, wherein an orthographic projection of the first high-frequency signal line on the base substrate extends in the row direction and is on a side of the orthographic projection of the first conductive portion on the base substrate away from the orthographic projection of the third conductive portion on the base substrate;

a third power line, wherein an orthographic projection of the third power line on the base substrate extends in the row direction and is between the orthographic projection of the first high-frequency signal line on the base substrate and the orthographic projection of the first conductive portion on the base substrate, and the third power line is configured to provide the second power supply terminal of the first sub-pixel;

a second power line, wherein an orthographic projection of the second power line on the base substrate extends in the row direction and is between the orthographic projection of the third power line on the base substrate and the orthographic projection of the first conductive portion on the base substrate, and the second power line is configured to provide the second power supply terminal of the second sub-pixel and the second power supply terminal of the third sub-pixel;

an initial signal line, wherein an orthographic projection of the initial signal line on the base substrate extends in the row direction and is between the orthographic projection of the first conductive portion on the base substrate and the orthographic projection of the third conductive portion on the base substrate;

a second reset signal line, wherein an orthographic projection of the second reset signal line on the base substrate extends in the row direction and is between the orthographic projection of the initial signal line on the base substrate and the orthographic projection of the third conductive block on the base substrate, the orthographic projection of the second reset signal line on the base substrate covers the orthographic projection of the eighth active portion on the base substrate, and a portion of the second reset signal line is configured to form a gate of the eighth transistor;

a first power line, wherein an orthographic projection of the first power line on the base substrate extends in the row direction and is between the orthographic projection of the first reset signal line on the base substrate and the orthographic projection of the third conductive block on the base substrate, and the orthographic projection of the main body portion of the enable signal line on the base substrate is between the orthographic projection of the first power line on the base substrate and the orthographic projection of the third conductive portion on the base substrate;

a first conductive block, wherein an orthographic projection of the first conductive block on the base substrate is on the orthographic projection of the first conductive portion on the base substrate, and the first conductive block is configured to form a second electrode of the first capacitor;

a second conductive block, wherein an orthographic projection of the second conductive block on the base substrate is on the orthographic projection of the second conductive portion on the base substrate, and the second conductive block is configured to form a second electrode of the second capacitor;

the third conductive block comprising the first component, the second component and the third component, wherein the orthographic projection of the first component on the base substrate is on the orthographic projection of the third conductive portion on the base substrate, and the first component is configured to form the second electrode of the storage capacitor; and wherein the orthographic projection of the third component on the base substrate covers the orthographic projection of the third active portion on the base substrate, and the third component is configured to form a gate of the driver transistor;

a fourth conductive block, wherein an orthographic projection of the fourth conductive block on the base substrate covers the orthographic projection of the ninth active portion on the base substrate, and a portion of the fourth conductive block is configured to form a gate of the ninth transistor;

a sixth conductive block comprising a first sub-conductive block and a second sub-conductive block, wherein an orthographic projection of the first sub-conductive block on the base substrate extends in the column direction, an orthographic projection of the second sub-conductive block on the base substrate extends in the row direction, the orthographic projection of the second sub-conductive block on the base substrate covers the orthographic projection of the sixth active portion on the base substrate, and a portion of the sixth conductive block is configured to form a gate of the sixth transistor;

a ninth conductive block, wherein an orthographic projection of the ninth conductive block on the base substrate overs the orthographic projection of the eleventh active portion on the base substrate, a portion of the ninth conductive block is configured to form a gate of the eleventh transistor, and the ninth conductive block is connected to an eleventh transfer portion and a twelfth transfer portion through via holes, respectively; and a tenth conductive block connected to the seventeenth sub-active portion through a via hole; and the third conductive layer further comprises:

a second high-frequency signal line, wherein an orthographic projection of the second high-frequency signal line on the base substrate extends in the column direction, and the second high-frequency signal line is connected to the first high-frequency signal line through a via hole;

a data signal line, wherein an orthographic projection of the data signal line on the base substrate extends in the column direction, and the data signal line is connected to the seventh sub-active portion, the fifteenth sub-active portion, and the nineteenth sub-active portion through via holes;

a first transfer portion connected to the first sub-active portion and the third conductive block through via holes, respectively;

a second transfer portion connected to the second sub-active portion and the initial signal line through via holes, respectively;

a seventh transfer portion connected to the first conductive block, the sixteenth sub-active portion, and the fourth conductive block through via holes, respectively;

an eighth transfer portion connected to the seventeenth sub-active portion and the enable signal line through via holes, respectively;

a ninth transfer portion connected to a fifth conductive block in the second conductive layer and the eighteenth sub-active portion and the twenty-second sub-active portion through via holes, respectively;

a tenth transfer portion connected to the fifth conductive block and the sixth conductive block through via holes, respectively;

an eleventh transfer portion connected to the twentieth sub-active portion and the ninth conductive block through via holes, respectively;

a twelfth transfer portion connected to the ninth conductive block and the second conductive block through via holes, respectively; and a sixteenth transfer portion connected to the twenty-first sub-active portion and a seventh conductive block in the second conductive layer through via holes, respectively, wherein the seventh conductive block is further connected to the second high-frequency signal line through a via hole;

wherein the orthographic projection of the first reset signal line on the base substrate further covers the orthographic projection of the tenth active section on the base substrate, and wherein a portion of the first reset signal line is configured to form a gate of the tenth transistor.

12. The display panel of claim 11, wherein the active layer further comprises:

a twelfth active portion configured to form a channel region of the twelfth transistor;

a twenty-third sub-active portion connected to a side of the twelfth active portion, wherein the twenty-third sub-active portion is configured to form the first end of the twelfth transistor, and the twenty-third sub-active portion is connected to the sixth transfer portion through a via hole;

a twenty-fourth sub-active portion connected to an other side of the twelfth active portion and configured to form the second end of the twelfth transistor;

a thirteenth active portion configured to form a channel region of the thirteenth transistor;

a twenty-fifth sub-active portion connected to a side of the thirteenth active portion and configured to form the first end of the thirteenth transistor, wherein the twenty-fifth sub-active portion is connected to the sixth transfer portion through a via hole;

a twenty-sixth sub-active portion connected to an other side of the thirteenth active portion and configured to form the second end of the thirteenth transistor;

a fourteenth active portion configured to form a channel region of the fourteenth transistor;

a twenty-seventh sub-active portion connected to a side of the fourteenth active portion and configured to form the first end of the fourteenth transistor, wherein the twenty-seventh sub-active portion is connected to the sixth transfer portion through a via hole;

a twenty-eighth sub-active portion connected to an other end of the fourteenth active portion and configured to form the second end of the fourteenth transistor;

the second conductive layer further comprises:

a twelfth conductive block, wherein an orthographic projection of the twelfth conductive block on the base substrate covers an orthographic projection of the twelfth active portion on the base substrate, and the twelfth conductive block is configured to form a gate of the twelfth transistor;

a thirteenth conductive block, wherein an orthographic projection of the thirteenth conductive block on the base substrate covers an orthographic projection of the thirteenth active portion on the base substrate, and the thirteenth conductive block is configured to form a gate of the thirteenth transistor; and a fourteenth conductive block, wherein an orthographic projection of the fourteenth conductive block on the base substrate covers an orthographic projection of the fourteenth active portion on the base substrate, and the fourteenth conductive block is configured to form a gate of the fourteenth transistor; and the third conductive layer further comprises:

a thirteenth transfer portion connected to the twenty-fourth sub-active portion through a via hole;

a fourteenth transfer portion connected to the twenty-sixth sub-active portion through a via hole; and a fifteenth transfer portion connected to the twenty-eighth sub-active portion through a via hole; and wherein the display panel further comprises:

a fourth conductive layer on a side of the third conductive layer away from the base substrate, the fourth conductive layer comprising:

a twentieth conductive block configured to form the first electrode of the first sub-pixel, wherein the twentieth conductive block is connected to the thirteenth transfer portion through a via hole;

a twenty-first conductive block configured to form the first electrode of the second sub-pixel, wherein the twenty-first conductive block is connected to the fourteenth transfer portion through a via hole; and a twenty-second conductive block configured to form the first electrode of the third sub-pixel, wherein the twenty-second conductive block is connected to the fifteenth transfer portion through a via hole.

13. A display device comprising the display panel of claim 1.

* * * * *